US008364822B2

(12) United States Patent
Takeda et al.

(10) Patent No.: US 8,364,822 B2
(45) Date of Patent: Jan. 29, 2013

(54) VPN COMMUNICATION CONTROL DEVICE, COMMUNICATION CONTROL METHOD IN VPN, AND VIRTUAL DEDICATED NETWORK MANAGEMENT DEVICE

(75) Inventors: Tomonori Takeda, Tokyo (JP); Ichiro Inoue, Tokyo (JP); Hisashi Kojima, Tokyo (JP); Kaori Shimizu, Tokyo (JP); Nobuaki Matsuura, Sayama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1355 days.

(21) Appl. No.: 10/543,589

(22) PCT Filed: Jan. 29, 2004

(86) PCT No.: PCT/JP2004/000818
§ 371 (c)(1),
(2), (4) Date: Jul. 27, 2005

(87) PCT Pub. No.: WO2004/068805
PCT Pub. Date: Aug. 12, 2004

(65) Prior Publication Data
US 2006/0136233 A1 Jun. 22, 2006

(30) Foreign Application Priority Data

Jan. 31, 2003 (JP) .................................. 2003-23157
Apr. 25, 2003 (JP) ................................ 2003-121656
Aug. 29, 2003 (JP) ................................ 2003-306563

(51) Int. Cl.
*H06F 15/16* (2006.01)
(52) U.S. Cl. ................... 709/227; 726/3; 726/4; 726/13; 726/15; 709/238; 709/239; 709/240; 709/242

(58) Field of Classification Search .................. 709/227, 709/28, 229; 370/254, 351, 352
See application file for complete search history.

(56) References Cited

U.S. PATENT DOCUMENTS
(Continued)

FOREIGN PATENT DOCUMENTS
EP  1 176 781 A2  1/2002
JP  2000-244508 A  9/2000
(Continued)

OTHER PUBLICATIONS

"Establishing a VPN tunnel without Nortel"—Anonymous, Gelileo Int., 1998 http://support.travelport.com/NR/rdonlyres/DCB93980-5ECA-4350-9EFA-A87E38D3897A/0/VPNTunnellingUsingW2K.pdf.*

(Continued)

*Primary Examiner* — Krista Zele
*Assistant Examiner* — Randy Scott
(74) *Attorney, Agent, or Firm* — Harness, Dickey & Pierce, P.L.C.

(57) ABSTRACT

A plurality of pieces of information about a link (hereinafter referred to as "link information"), which are stored in a common DB, are categorized in accordance with the VPN related to each piece of link information. VPNID, which is information for identifying each VPN, is added to each piece of link information which has been categorized. The link information for the same VPNID is extracted from the link information to which the VPNID for the common DB is added so as to be contained in the corresponding VPNDB. By doing this, it is possible to realize a path design for the customer easily by providing the network information in the VPN provider and the network information of the customer network while realizing a high scalability.

19 Claims, 29 Drawing Sheets

U.S. PATENT DOCUMENTS

| | | | | |
|---|---|---|---|---|
| 6,137,781 | A * | 10/2000 | Goto et al. | 370/255 |
| 6,205,488 | B1 | 3/2001 | Casey et al. | |
| 6,771,661 | B1 * | 8/2004 | Chawla et al. | 370/468 |
| 7,120,682 | B1 * | 10/2006 | Salama | 709/222 |
| 7,272,625 | B1 * | 9/2007 | Hannel et al. | 709/200 |
| 7,307,990 | B2 * | 12/2007 | Rosen et al. | 370/392 |
| 2002/0010866 | A1 * | 1/2002 | McCullough et al. | 713/201 |
| 2002/0018456 | A1 * | 2/2002 | Kakemizu et al. | 370/338 |
| 2002/0067725 | A1 * | 6/2002 | Oguchi et al. | 370/390 |
| 2002/0124066 | A1 | 9/2002 | Chang et al. | |
| 2002/0156828 | A1 | 10/2002 | Ishizaki et al. | |
| 2004/0081203 | A1 * | 4/2004 | Sodder et al. | 370/469 |
| 2004/0117653 | A1 * | 6/2004 | Shapira et al. | 713/201 |
| 2004/0141488 | A1 * | 7/2004 | Kim et al. | 370/338 |
| 2004/0158706 | A1 * | 8/2004 | Moritomo et al. | 713/153 |
| 2005/0249121 | A1 * | 11/2005 | Matsunaga | 370/238 |

FOREIGN PATENT DOCUMENTS

| | | |
|---|---|---|
| JP | 2001326693 | 11/2001 |
| JP | 2002-044141 A | 2/2002 |
| JP | 2002-281084 A | 9/2002 |
| JP | 2002252631 | 9/2002 |
| JP | 2003228550 | 8/2003 |
| JP | 2003258845 | 9/2003 |
| JP | 2004179769 | 6/2004 |

OTHER PUBLICATIONS

"SmartNet Optical VPN"—Anonymous, Tellium Inc., 1999 http://www.redtailonline.com/telm/applications/optical_vpn.html.*

Rekhter, Y., et al. (Editors), "A Border Gateway Protocol 4 (BGP-4)," Internet Engineering Task Force, Network Working Group, RFC 1771, Mar. 1995.

Ould-Brahim, Hamid, et al. (Editors), "GVPN Services: Generalized VPN Services Using BGP and GMPLS Toolkit," Internet Engineering Task Force, Provider Provisioned VPN Working Group, Internet Draft, Mar. 2003.

Anonymous, "StarNet Optical VPN," Tellium, Inc., 1999, http://www.redtailonline.com/telm/applications/optical_vpn.html.

* cited by examiner

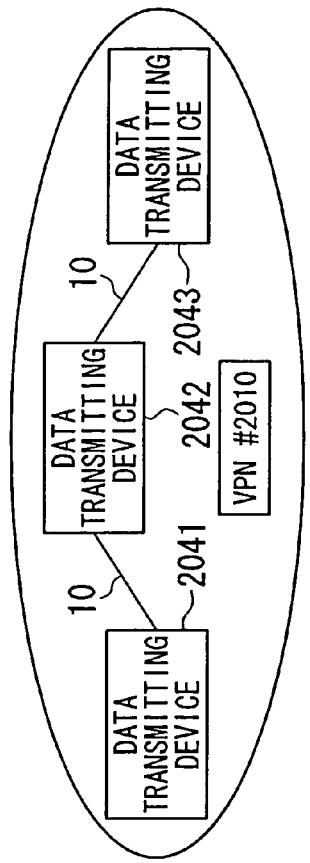
FIG. 19A2
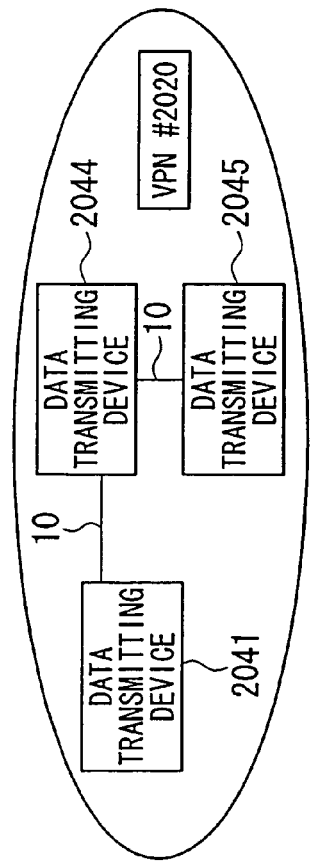
FIG. 19B2
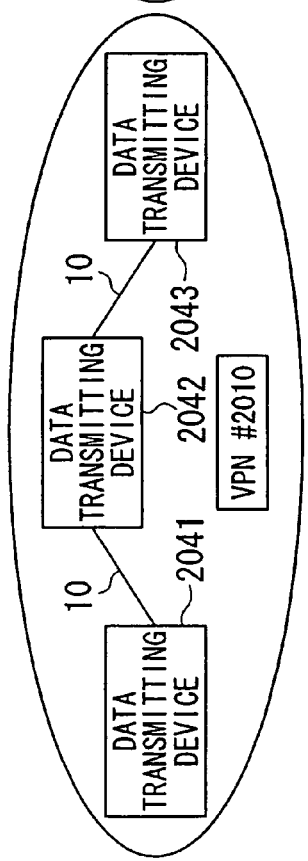
FIG. 19A1
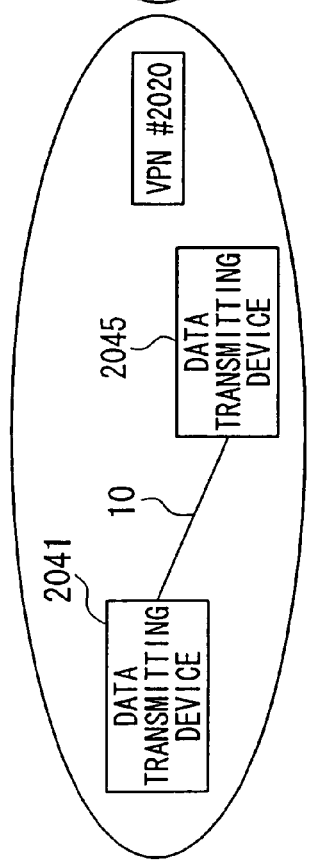
FIG. 19B1

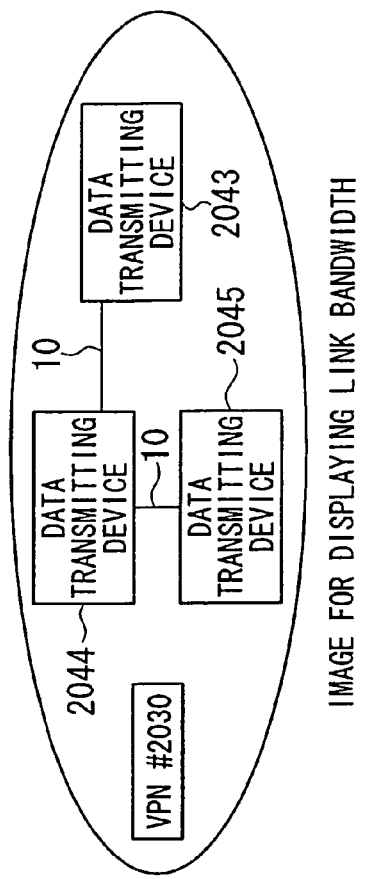
FIG. 19C2
IMAGE FOR DISPLAYING LINK BANDWIDTH
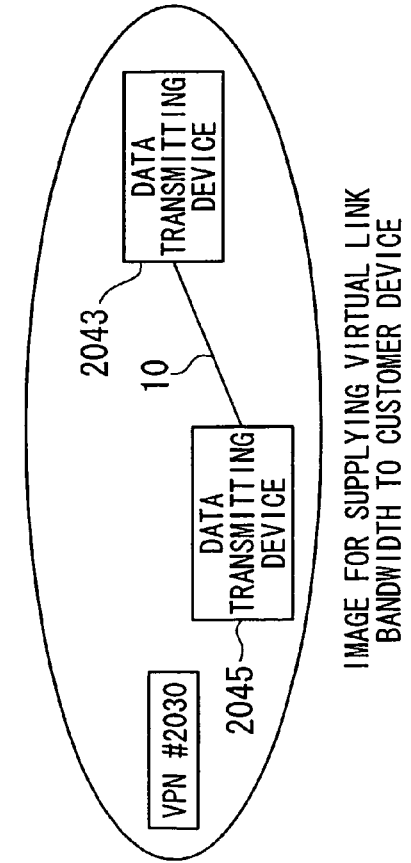
FIG. 19C1
IMAGE FOR SUPPLYING VIRTUAL LINK BANDWIDTH TO CUSTOMER DEVICE

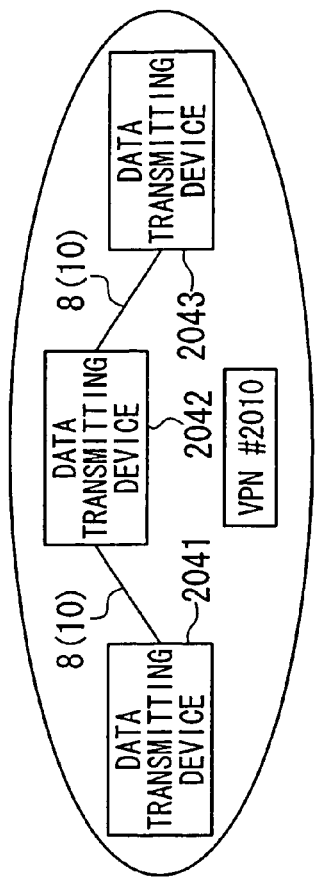
FIG. 26A2
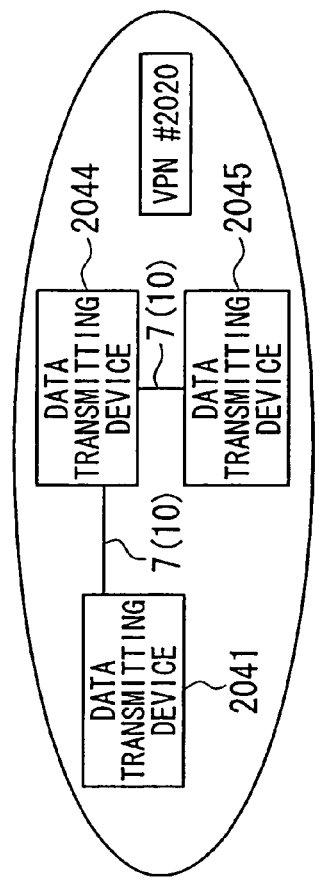
FIG. 26B2
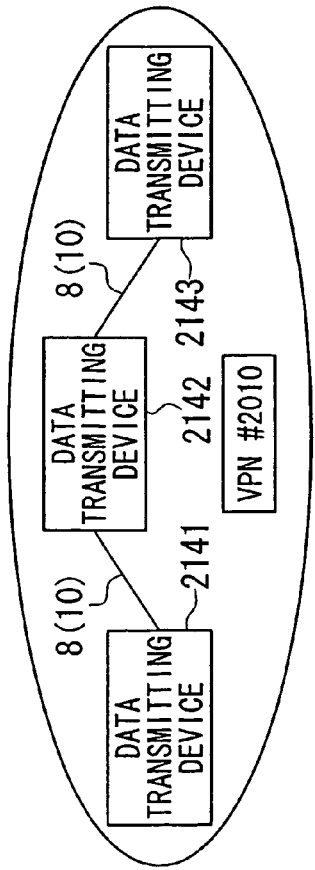
FIG. 26A1
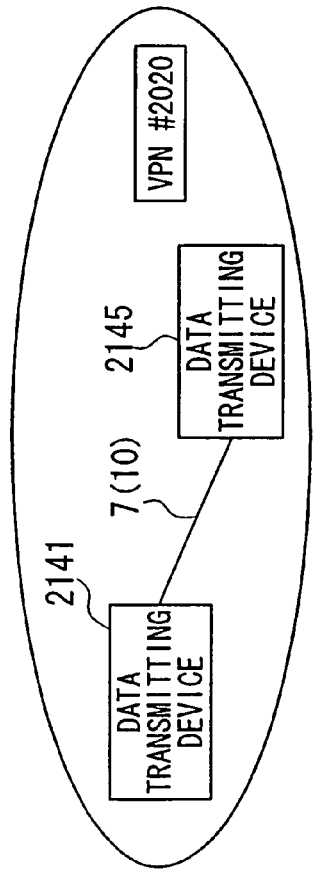
FIG. 26B1

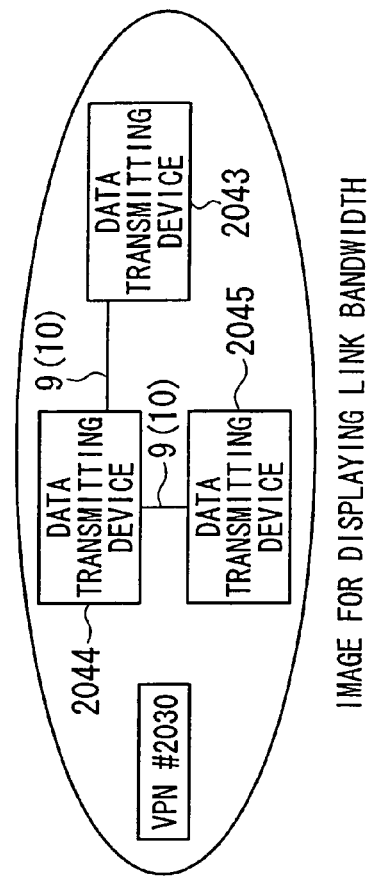
FIG. 26C1
IMAGE FOR SUPPLYING VIRTUAL LINK BANDWIDTH TO CUSTOMER DEVICE
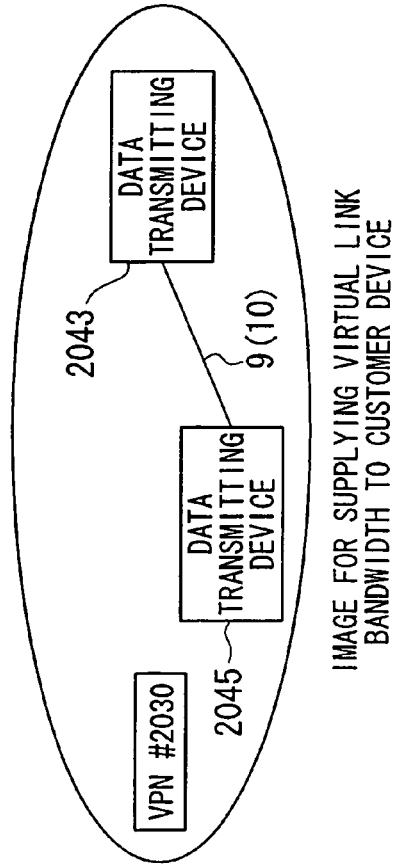
FIG. 26C2
IMAGE FOR DISPLAYING LINK BANDWIDTH

VPN COMMUNICATION CONTROL DEVICE, COMMUNICATION CONTROL METHOD IN VPN, AND VIRTUAL DEDICATED NETWORK MANAGEMENT DEVICE

TECHNICAL FIELD

The present invention is used for a VPN (Virtual Private Network). In particular, the present invention relates to an edge device in a network for setting a path between customer edge devices when a path setting request is issued from a customer.

Also, the present invention relates to a method for controlling a communication in a VPN (Virtual Private Network) for providing different network information for each customer and setting a path between customer edge devices when a request is issued from a customer, a communication controlling device and its program for realizing it, and a recording medium in which it is recorded.

Furthermore, the present invention relates to a virtual private network managing device for managing a virtual network information which includes information (hereinafter referred to as "link bandwidth information") about the bandwidth of a link between a data transmitting devices in the virtual private network and providing a virtual network supplying network to internet providers, etc.

BACKGROUND ART

For a conventional VPN for setting a path between customer devices when a request for setting a path is issued from a customer, there is a VPN which executes an enlargement for a BGP (Border Gateway Protocol; for example "A Border Gateway Protocol 4 (BGP-4) RFC1771", IETF, [online], published Mar. 1995, see [retrieved July 2003], Internet <URL:http://www.ietf.org/rfc/rfc1771.txt?number=1771>, exchanging an information in which a Community is added to the information of the customer edge device by the BGP, and selecting the information by the Community in the edge device in the network, generating a tunnel between the edge devices in the network which have the customer edge device which belongs to the same VPN, and providing a route information of different customer networks for each VPN. (For example, "GVPN:GeneralizedProvIDer-provisioned Port-based VPNs using BGP and GMPLS draft-ouldbrahim-ppvpn-gvpn-bgpgmpls-03.txt, IETF, [online], published Mar., 2003,[retrieved Jul. 2003], Internet, see <URL:http://www.ietf.org/internet-drafts/draft-ouldbrahim-ppvpn-gvpn-bgpgmpls-03.txt>")

Furthermore, there is a member for providing different information for each customer by disposing a central server and exchanging the information from the central server in a limited manner (for example, "StarNet Optical VPN", Tellium, [online], unknown, [retrieved July, 2003], Internet, see URL:http://www.tellium.com/applications/optical_VPN.html>")

However, it is not possible to provide a network information in the VPN provider by a method which uses the BGP. Therefore, the customer does not know a vacant resource information for the network in the VPN provider; thus, the customer does not know whether or not it is possible to set a path between the customer edge devices. Thus, there is a problem in that it is difficult to design the path.

Also, scalability is not desirable in a method which uses the central server when the central server is down; thus, an entire network is affected.

For a problem in such a virtual private network managing device which manages the virtual network information in the virtual network supplying network for supplying a plurality of VPNs (Virtual Private Network) in a conventional technology, there is a member for dividing the virtual network information for each VPN so as to contain and manage thereof, and supplying this virtual network information to each customer device which manages the individual VPN. (For example, Japanese Unexamined Patent Application, First Publication No. 2002-252631, (Claim 1, Paragraphs No. [0015], [0017])). According to this virtual private network managing device, the virtual network information is divided for each VPN so as to be managed. Therefore, the virtual network information which relates to a VPN which is contained in the database can be supplied such that the VPN should not be leaked to the customer device which manages other VPN. Thus, it is possible to improve a confidentiality of the virtual network information.

However, it is possible to supply the virtual network information by improving the confidentiality in a conventional virtual private network managing device which manages the virtual network supplying network for supplying the VPN. However, there is a possibility that the data transferring route may be changed during the operation for the information which represents the link bandwidth for the data transferring route in the VPN in the virtual network supplying network. Therefore, there was a problem in that it is not possible to supply the information which represents the accurate link bandwidth in the customer device which manages the VPN.

Also, it is not possible to propose only necessary information for a condition during a resource contract by omitting the supply of the necessary information for the customer in a method which uses the above explained conventional BGP and the virtual private network managing device. Furthermore, there was a problem in that the provider which provides the path service cannot realize an effect for evading an undesirable side-effect in that an unnecessary detail information may be supplied.

DISCLOSURE OF THE INVENTION

The present invention was made by such a background. An object of the present invention is to provide a VPN communication controlling device which can realize a path design for the customer easily by providing the network information in the VPN provider and the network information of the customer network while realizing a high scalability.

Another object of the present invention is to provide a method for controlling communication in VPN, a communication controlling device for realizing it, its program, and a recording medium in which the program is recorded for realizing the path design for the customer easily by supplying the network information in the VPN provider to the customer.

Furthermore, another object of the present invention is to provide a virtual private network managing device, a virtual private network managing device which can supply the information which represents the accurate link bandwidth for the customer device, a virtual private network supplying system, a virtual private network managing program, and a recording medium in which the program is recorded with regardless to the data transferring route in the VPN in the virtual network supplying network.

In the present invention, a network information in an optical VPN provider which is different for each customer is supplied by using a method in which a detail link information such as OSPF (Open Shortest Path First) can be exchanged in the network, identifying the link which can be used by each customer, and supplying only the link information which can be used by each customer to the customer. Also, a tunnel is generated between the customer edge devices. The provider relays the exchanged network information by using the generated tunnel.

By doing this, the customer can obtain the network information of the network information in the VPN provider and the customer network information; thus, it is possible to design the path by using this information.

That is, the present invention is a VPN communication controlling device as an edge device in a network having: a common database (common DB), disposed in a VPN for setting a path between edge devices in a network when a path setting request is issued by a customer so as to supply a different network information for each customer so as to be used for setting a path; a link information setting section for setting a link information in the common DB; a link information exchanging section for exchanging the link information between the other device and the device itself; and a route calculating section which determines a transferring route for a control information which is used for exchanging the link information.

Here, the present invention is characterized in further including a VPNDB generating section for generating a VPNDB which is a DB which is different for each VPN; a VPNID setting device for adding VPNID as an information for identifying each VPN to each link information, categorized for each VPN related to the link information, by categorizing the link information in the common DB; and a filtering section for extracting the link information for the same VPNID from the link information to which the VPNID for the common DB is added so as to contain in a corresponding VPNDB.

By doing this, it is possible to have the VPNDB in which the link information for each VPN is contained in addition to the common DB. Therefore, the customer can obtain the link information which relates to the VPN which the customer belongs to by using the DB for each VPN. In such a case, the VPNDB is generated based on the link information for the common DB. Therefore, it is possible to take the link condition information for an entire network into account for the VPNDB. As a result, the customer can obtain the network information of the network information in the VPN provider and the customer network information; thus, it is possible to design the path by using this information.

Also, the VPN communication controlling device may further include a section for setting a tunnel for generating tunnels for exchanging the ling information between the other edge devices in other network.

By doing this, it is possible to receive a supplied link information efficiently from the edge device which has the VPNDB in other network.

Also, the communication controlling device may further include: a VPNDB in a part of the common DB; and a section for adding an identification information for identifying recorded contents in each DB.

By doing this, it is possible to use a memory effectively because it is not necessary to divide the memory between the common DB and the VPNDB.

Also, the VPN communication controlling device may further include a section for exchanging the link information between the other devices by using the transferring route for the control information determined according to the route calculating section.

By doing this, it is possible to set the route to the edge device which has the VPNDB in other network flexibly; thus, it is possible to obtain the ling information which the edge device in the network itself needs.

Also, the VPN communication controlling device may further include: a section for notifying whether or not a VPNDB in the device itself is a VPNDB relating to any one of VPNs; and a section for transferring the recorded contents in the VPNDB in the device itself according to a request from the other device to the other device.

By doing this, it is not necessary to have an unnecessary VPNDB in each edge device in a network; thus, it is possible to use the resource effectively.

Also, the VPN communication controlling device may further include: a section for performing a filtering operation by the filtering section and setting a tunnel by the section for setting a tunnel for the other device when the device itself performs the filtering operation: and a section for setting a tunnel by the section for setting a tunnel for the other device when the other device performs the filtering operation by the filtering section.

By doing this, it is not necessary to perform a filtering operation by the filtering section by each edge device in a network simultaneously; thus, it is possible to use the resource effectively.

In such a case, the VPN communication controlling device may further include a section which determines that the device itself performs the filtering operation when a hash value which is obtained by adding an ID of the device itself for identifying the device itself and the VPNID is greater than a hash value which is obtained by adding an ID for the other device which is an information for identifying the other device and the VPNID.

By doing this, it is possible to use the resource effectively by performing the filtering operation by any one of the edge device in a networks.

Also, the VPN communication controlling device may further include: a customer route flag setting function when the link information which is received from a customer edge device is issued to the device itself; a customer link information extracting section which extracts the link information in which the customer route flag is set; and a section which transfers the link information which is extracted by the customer link information extracting section together with the customer route flag and transfers the link information which is extracted by the customer link information extracting section by deleting the customer route flag.

By doing this, the link information which is received from the customer edge device is separated from the rest of the link information by using the customer route flag. By doing this, for example, when a request from the edge device in other network or the customer edge device for a link information which relates to a specific customer network is issued, it is possible to respond to this request. If the customer route flag is not used, only an identification for the link information by the VPNID is performed. Therefore, it is difficult to identify from which customer network an information exists. Also, it is difficult to identify whether or not it is an information in the provider's network clearly. All of the link information which has a corresponding VPNID is transmitted to the edge device in other network or the customer edge device. By doing this, there is a case in which an unnecessary information is contained in the information which is exchanged with the edge device in a network or the edge device in a network and the customer edge device. Thus, it is possible to exchange the information by selecting a truly necessary information by using the customer route flag; thus, it is possible to reduce the amount of the exchanged information.

Also, the VPN communication controlling device may further include a signaling section for securing a resource for setting a path by receiving a path setting request from a customer edge device and transfers a path setting request to a next device in a network according to a path setting request.

Other point of view for the present invention is a network having with the VPN communication controlling device according to the present invention, which is an only network including an edge device in a network which is provided with the filtering section. In this way, it is possible to use the resource effectively by limiting the edge device in a network which is provided with the filtering section.

Other point of view for the present invention is a program for realizing functions corresponding to the VPN communication controlling device as an edge device in the network, including the funcntions: a function corresponding to a common database supplying different network information for each customer to the information processing device by intalling the program to the information processing device so as to be used for setting a path by disposing in the VPN for setting a path between the edge devices in the network when a path setting request is issued by the customer; a link information setting function for setting the link information in this common DB; a link information exchanging function for exchanging the link information between the other device and the device itself; a route calculating function for determining the transferring route the used for exchanging the link information.

Here, the present invention is characterized in including a VPNDB generating function for generating a VPNDB which is a DB different for each VPN; a VPNID setting function for adding VPNID as an information for identifying each VPN to each link information categorized for each VPN related to the link information by categorizing the link information in the common DB; and a filtering function for filtrating the link information for the same VPNID from the link information to which the VPNID for the common DB is added so as to contain the link information in a corresponding VPNDB.

Also, the program may further includes a function for generating a tunnel for exchanging the ling information between the other edge devices in other network.

Also, the program may further includes a function corresponding to the VPNDB in a part of the function corresponding to the common DB and adding an identification information for identifying the recorded contents in each DB.

Also, the program may further include a function for exchanging the link information between the other devices by using the transferring route for the control information which is determined according to the route calculating function.

Also, the program may furuther include functions for: notifying whether or not a VPNDB in the device itself is a VPNDB which relates to any one of VPNs; and transferring the recorded contents in the VPNDB in the device itself according to a request from the other device to the other device.

Also, the program may further include functions for: performing a filtering operation by the filtering function and setting a tunnel by the function for setting a tunnel for the other device when the device itself performs the filtering operation: and setting a tunnel by the function for setting a tunnel for the other device when the other device performs the filtering operation by the filtering function.

In such a case, the program may further include a function for determining that the device itself performs the filtering operation when a hash value which is obtained by adding an ID of the device itself for identifying the device itself and the VPNID is greater than a hash value which is obtained by adding an ID for the other device which is an information for identifying the other device and the VPNID.

Also, the program may further include functions for: setting a customer route flag when the link information which is received from a customer edge device is issued to the device itself; and a customer link information extracting function which extracts the link information in which the customer route flag is set; and transferring the link information which is extracted by the customer link information extracting function together with the customer route flag and transfers the link information which is extracted by the customer link information extracting function by deleting the customer route flag.

Also, the program may further include a signaling function for securing a resource for setting a path by receiving a path setting request from a customer edge device and transferring a path setting request to a next device in a network according to a path setting request.

Furthermore, other point of view for the present invention is an information-processing-device-readable recording medium having the program according to the present invention. The above explained information processing device can install the program of the present invention by using this recording medium because the program of the present invention is recorded on the recording medium of the present invention. Otherwise, it is possible to install the program of the present invention in the information processing device directly via the network from the server which maintains the program of the present invention.

By doing this, it is possible to realize a VPN communication controlling device which can realize a path design for the customer easily by providing the network information in the VPN provider and the network information of the customer network while realizing a high scalability.

In order to accomplish the above object, in a communication controlling device in the VPN for supplying the different network information for each customer by transferring the link information to the edge device in the network from the customer edge device and setting a path between the customer edge devices when a path setting request is issued from the customer, the link information exchanging section for exchanging the link information between the devices, an ID setting section for setting the VPN ID, an ID adding section for adding the VPN ID to the link information which is sent from the other device, and a filtering section for extracting only the link information of which VPN ID is identical are disposed in the edge device in the network.

Also, the above explained communication controlling device is characterized in that a GMPLS enlarging OSPF is used for a link information exchanging section in the communication controlling device according to the present invention.

Also, the above explained communication controlling device is characterized in adding a plurality of VPN IDs to the link information.

Also, the communication controlling device may further include: a VPN address setting section for setting a link address and a node address for each VPN; and an address converting section for converting a link address and a node address which are common for all the VPN to the link address and the node address for each VPN in addition to each device.

In the communication controlling method for supplying different network information for each customer and setting a path between the customer edge devices when a path setting request is issued by the customer, it is characterized in that the edge device in the network exchanges the link information with the other node when the edge device in the network receives the link information from the customer edge device and exchanges the link information with the other node and maintains the link information in the network so as to filtrate the link information in the customer edge device so as to propose only a necessary information for the customer for setting the VPN.

In the present invention, a network information in an optical VPN provider which is different for each customer is supplied by using a method in which a detail link information such as OSPF (Open Shortest Path First) can be exchanged in the network, identifying the link which can be used by each customer, and supplying only the link information which can be used by each customer to the customer. The customer can obtain the network information in the VPN provider; thus, it is possible to set a path by using this information.

A virtual private network managing device for supplying a management information to a customer device which manages the virtual private network separately and integrally managing a virtual network supplying network which supplies the virtual private network includes: a virtual route registering section which registers a virtual route which is formed by a data transferring route in the virtual network supplying network so as to correspond to a virtual link bandwidth; a route determining section which determines a corresponding route which is formed by a data transferring route which corresponds to the virtual route which is registered by the route determining section; a virtual link bandwidth allocating section which allocates the virtual link bandwidth to the corresponding route which is determined by the route determining section; and a virtual private network supplying device which supplies an information relating to the virtual link bandwidth which is allocated by the virtual link bandwidth allocating section to the customer device.

The virtual private network managing device may further include a route change detecting section which detects a route change in the data transferring route in the virtual network supplying network. It is characterized in that, if the route change detecting section detects the route change, the route determining section determines the corresponding route which corresponds to the virtual route which is registered by the virtual route registering section according to the data transferring route of which route change is detected by the route change detecting section; the virtual link bandwidth allocating section allocates the virtual link bandwidth to the corresponding route which is determined by the route determining section; and the virtual link band width information supplying function supplies the information which relates to the virtual link bandwidth which is allocated by the virtual link bandwidth allocating section to the customer device.

In the virtual private network managing device, the route change detecting section detects a route change of the data transferring route in the virtual network supplying network according to a deletion of the link which forms the data transferring route. By doing this, it is possible to supply the information which indicates an accurate link bandwidth to the customer device for detecting the changed path in the data transferring route in the virtual network supplying network according to the deletion of the link even if a route is changed during the operation of the virtual private network.

In the virtual private network managing device, the route change detecting section detects a route change of the data transferring route in the virtual network supplying network according to an addition of the link forming the data transferring route. By doing this, it is possible to supply the information which indicates an accurate link bandwidth to the customer device for detecting the changed route in the data transferring route in the virtual network supplying network according to the addition of the link even if a route is changed during the operation of the virtual private network.

The virtual private network managing device may further include a displaying section for displaying an information relating to the virtual link bandwidth allocated by the virtual link bandwidth allocating section on its own display. By doing this, it is possible that the network manager, etc., to check the information which relates to the virtual link bandwidth which is supplied to the customer device because the information which relates to the virtual link bandwidth is displayed on its display.

The virtual private network managing device may further include a currently-used bandwidth information receiving section for receiving the currently-used bandwidth information for establishing a connection in a data transferring route in the virtual network supplying network. It is characterized in that: the virtual link bandwidth allocating section allocates the currently-used bandwidth information which is received by the currently-used bandwidth information receiving section to the corresponding route; and, the virtual link band width information supplying function supplies the information which relates to the virtual link bandwidth and the currently-used bandwidth information which are allocated by the virtual link bandwidth allocating section to the customer device. By doing this, it is possible to establish a connection reliably while the customer device acknowledges the currently-used bandwidth because the virtual link bandwidth information and the currently-used bandwidth information are supplied to the customer device.

The virtual private network supplying system includes: the virtual private network managing device of the present invention; and a customer device for requesting a management information from the virtual private network managing device so that the virtual private network managing device supplies the information relating to the virtual link bandwidth to the customer device. By such a structure, it is possible to register a predetermined virtual route which relates to the virtual private network and supply the information which indicates an accurate link bandwidth to the customer device in order to allocate the virtual link bandwidth to the route which corresponds to the registered virtual route with regardless to the data transferring route in the VPN of the virtual network supplying network.

The virtual private network supplying system includes: a customer device for transmitting currently-used bandwidth information for establishing a connection in a data transferring route in the virtual network supplying network; and a virtual private network managing device according to Claim 33 for receiving the currently-used bandwidth information which is transmitted from the customer device. It is characterized in that the virtual private network managing device allocates the currently-used bandwidth information to the corresponding route together with the virtual link bandwidth and supplies the information which relates to the virtual link bandwidth and the currently-used bandwidth information to the customer device. By doing this, it is possible to establish a connection reliably while the customer device acknowledges the currently-used bandwidth because the virtual link bandwidth information and the currently-used bandwidth information are supplied to the customer device.

Furthermore, the present invention is a virtual private network managing program for executing processes for each section in the virtual private network managing device which correspond to the computer respectively.

Furthermore, the present invention is a recording medium in which the virtual private network managing program is recorded.

BRIEF DESCRIPTION OF DRAWINGS

FIGS. 19A1 to 19C2 are views for showing examples for images for supplying the virtual link bandwidth information which relate to each VPN.

FIGS. 26A1 to 26C2 are views for showing examples for images for supplying virtual link bandwidth information and the information for the rest of the bandwidth which relate to each VPN.

BEST MODE FOR CARRYING OUT THE INVENTIONS

Next, a first embodiment of the present invention is explained with reference to drawings.

Figure 1:
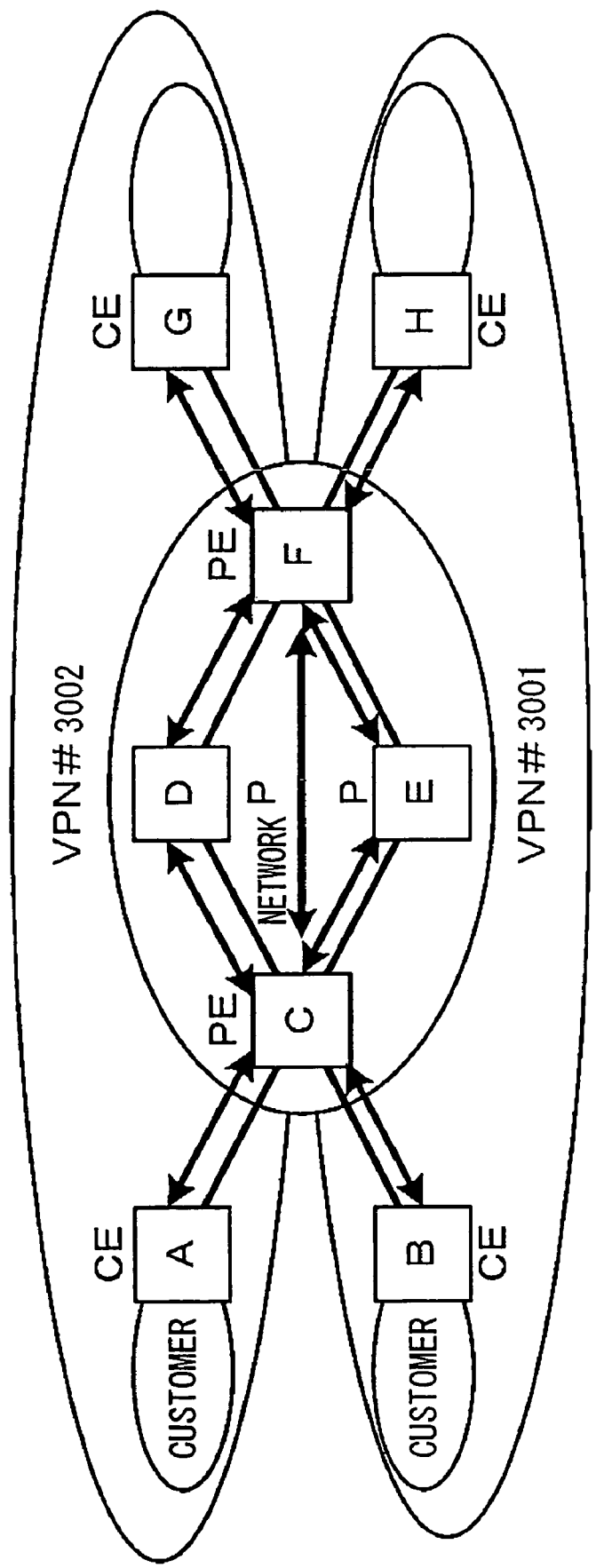
FIG. 1 is a view for showing a structure for a network.

FIG. 1 is a view for showing a structure for a network. In the drawing, PE (Provider Edge) indicates an edge device in a network. P indicates a device in a network. CE (Customer Edge) indicates a customer edge device respectively. Also, the edge device in a network, the device in a network, and the customer edge device are indicated by PE, P, and CE in sentences in the embodiments. The PE is connected at least a CE. On the other hand, the PE is not connected to the CE. A space between the P and the PE, the space between the P and the P, the space between the PE and the PE, and the space between the CE and the PE are connected by the data link and the controlling link.

The data link transmits a main datum. The controlling link transmits the control information. There is a case in which the space between the PE and the PE may be connected only by the control link. Such a controlling link is called a tunnel. Also, an identifier for indicating which VPN can be used is added each data link in the network.

Figure 2:
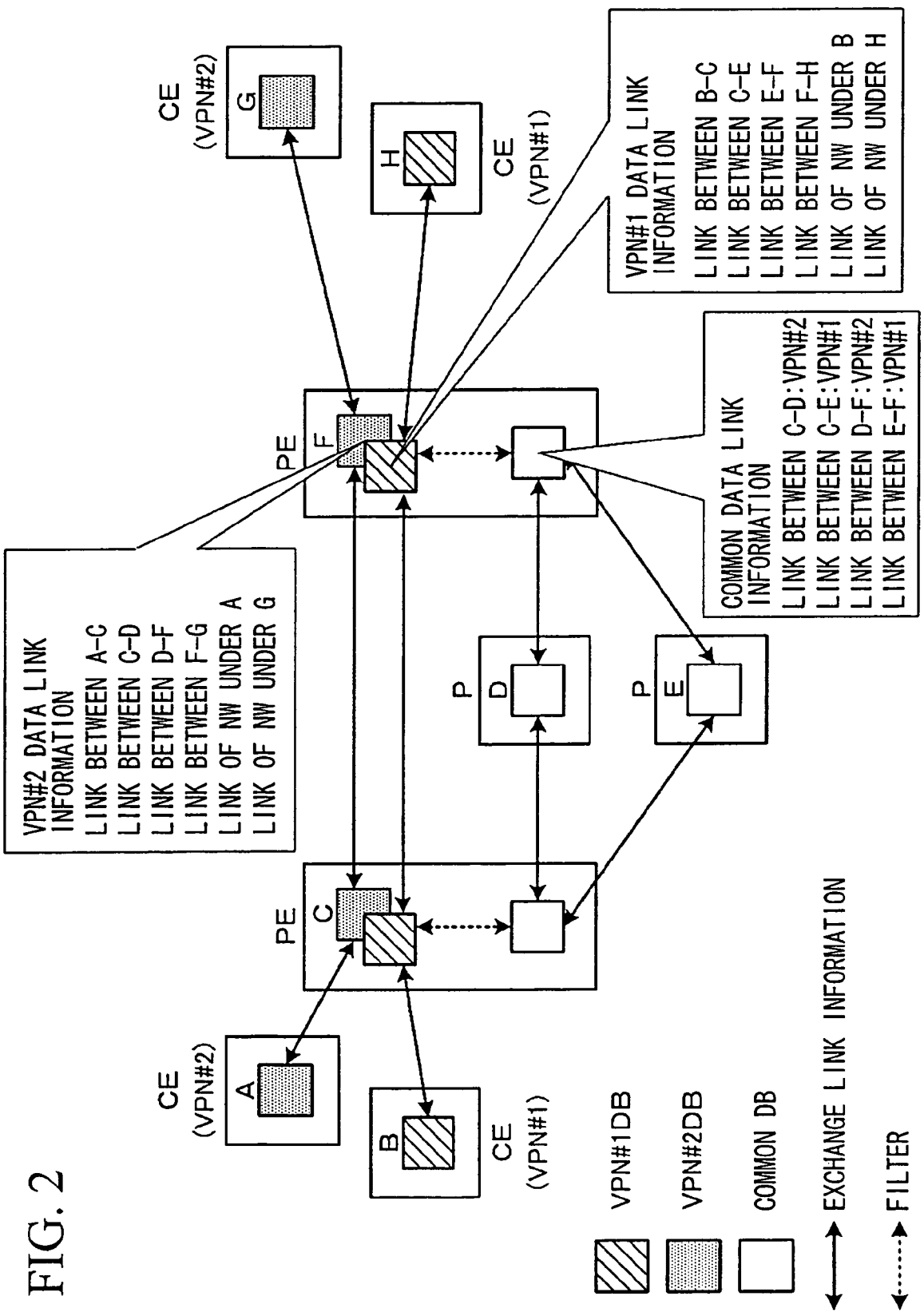
FIG. 2 is a view for exchanging and maintaining a link information.

FIG. 2 is a view for exchanging and maintaining a link information. The PE has a VPNDB 10 which contains different information for each VPN and a common DB 9 which contains only an information in the network. Only the information to which VPNID is added among the information in the common DB 9 is sent to the VPNDB 10. Also, the information of the VPNDB is synchronized with the information of the CE and the PE which are connected by the controlling link. By doing this, it is possible to notify to each CE only the network information of the VPN to which the CE belongs.

Here, the information is exchanged between CE-B and the H, and between PE-C and F by a VPN #1DB which is a contract DB (database). The information is exchanged between the PE-C and F by a VPN #2DB which is a contract DB. The information is exchanged in other structure in the drawing such as the edge device in a network PE, the device in the network P-D, and E, by the common DB.

Although it is not particularly shown in PE which is shown in FIG. 2, it is acceptable if there is a function for the virtual private network managing device in which a plurality of data links are corresponded (concentrated) to the virtual link after the link information which has a corresponding VPNID is extracted. By disposing a function for extracting (concentrating) the link information in this way, it is possible to set the information which is notified to the customer flexibly according to the resource contract. By doing this, it is possible to omit supplying an unnecessary information for the customer; thus, it is possible to propose only an information clearly which is necessary for the condition which is described in the resource contract. Furthermore, the provider which provides the path service can realize an effect for evading an undesirable side-effect in that an unnecessary detail information may be supplied.

Figure 3:
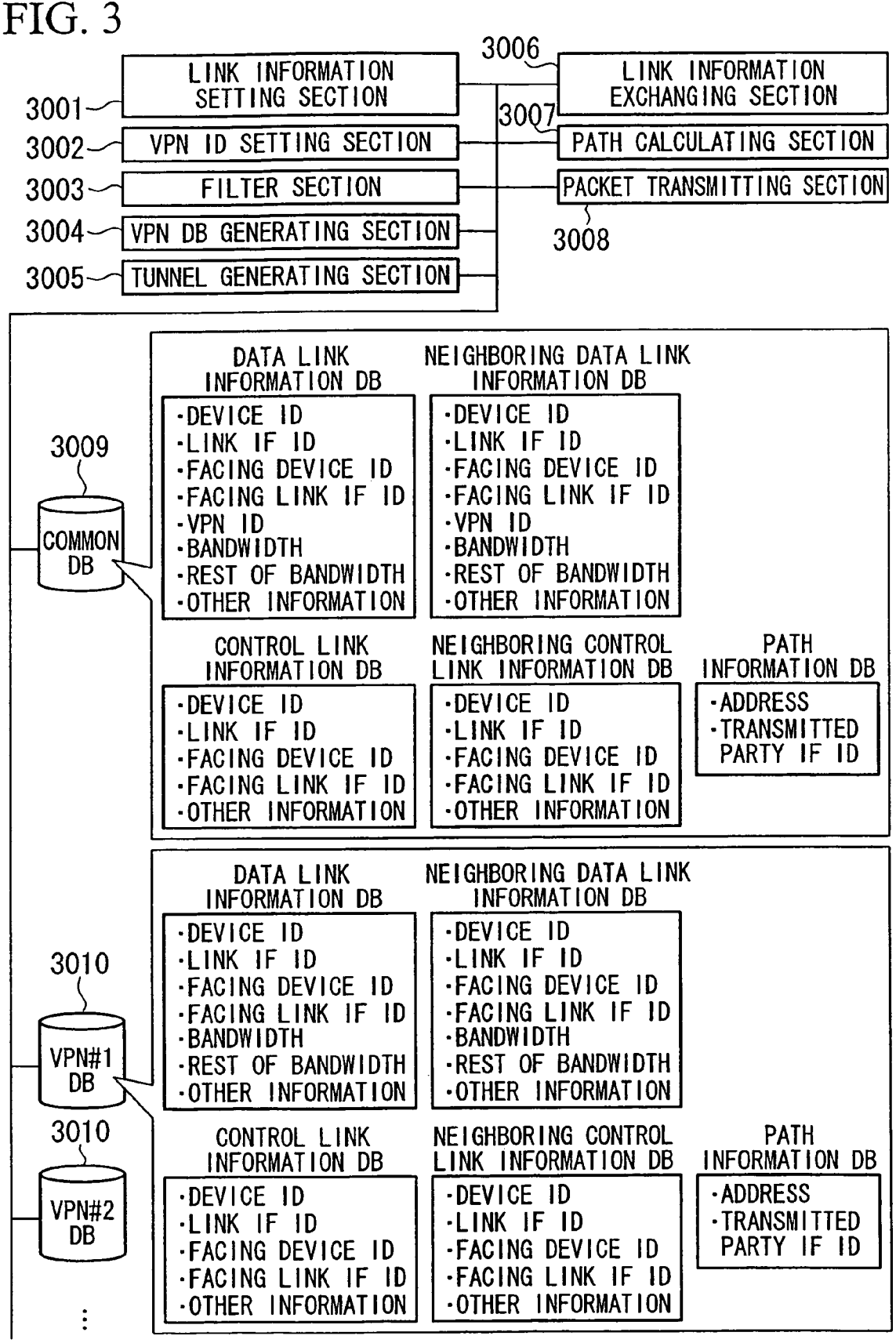
FIG. 3 is a view for showing a structure for a PE.

FIG. 3 is a view for showing a structure for a PE. In the drawing, a common DB 3009 is a DB for performing information with PE, and P in the network. VPNDB 3010 which is disposed for each VPN such as the VPN #1DB, and the VPN #2DB is a DB for performing an information exchange with the VPNDB 3010 in the corresponding VPN for the CE and the PCE which belong to the corresponding VPN.

The neighboring data link information in the common DB 3009 contains various information which relates to the data link of which remote device is the P or the PE among the data link of which terminal point is this PE. For example, in an example in FIG. 1, the data link C-D, data link C-E correspond to the neighboring data link in the common DB 3009 of the PE (C). Various information which relate to the data link indicates as follows respectively. A device ID indicates an information for identifying the device for this device. A link IF (interface) ID indicates an information for identifying the ID in this device in this link. A remote device ID indicates an information for identifying this remote device of this link. A remote link IFID indicates an information for identifying the IF of the link in the remote device of this link. VPNID indicates an identification information for indicating which VPN this link belongs to. A bandwidth indicates a bandwidth which can be used in the rest of this link. In addition, there are sequence number, and a time until it is abandoned.

The data link information DB in the common DB 3009 is formed by a data link information which is contained in the neighboring data link information in the common DB 3009 and the data link information which is obtained by a link information exchanging section 6 from other device via a control link which is contained in the neighbor control link information DB in the common DB 9.

A neighbor control link information DB in the common DB9 contains various information such that the remote device is P or PE in a control link of which PE is an end point, the information is not generated by the section 300 for setting a tunnel, or there is a neighbor data link in between the remote device.

For example, in an example in FIG. 1, the control link C-D, control link C-E correspond to the neighbor control link in the common DB 9 of the PE (C). Various information which relate to the control link are as follows. A device ID indicates an information for identifying this device. A link IFID indicates an information for identifying the IF in this device in this link. A remote device ID indicates an information for identifying the remote device of this link. A VPNID indicates an identification information which indicates to which VPN this link belongs. In addition, there are sequence number, and a time until it is abandoned.

The control link information DB in the common DB 3009 is formed by a control link information which is contained in the neighboring control link information DB in the common DB 3009 and the control link information which is obtained by a link information exchanging section 3006 from other device via a control link which is contained in the neighbor control link information DB in the common DB 3009.

A route information DB indicates from which control link the information should be transmitted of which beneficiary address is various device ID and a link IFID by using the control link information DB in the common DB 3009 such that the route information DB has a beneficiary address and transmitting IFID.

The VPNDB 3010 is formed by a neighboring data link information DB, a data link information DB, a neighbor control link information DB, and a route information DB as similarly to the common DB 3009.

The neighboring data link DB in the VPNDB 10 contains various information which relates to the data link of which remote device is the CE of which remote device belongs to this VPN among the data link of which terminal point is this PE. In an example shown in FIG. 1, the data link C-B corresponds to the neighboring data link in the BPNDB 3010 of the VPN #1 of the PE(C). Various information are the same as the data link information in the common DB 3009 except that there is not an VPNID.

The data link information DB in the VPNDB 3010 is formed by the data link information which is contained in the neighboring data link information DB in this VPNDB 3010, the data link information which is obtained by extracting the link information which has this VPNID among the data link information DB in the common DB 3009 of this PE by a filtering section 3003, and a control link information which is obtained by the link information exchanging section 3006 from the other device via the control link which is contained in the neighbor control link information DB in this VPNDB 3010.

The neighbor control link information DB in the VPNDB 3010 contains various information which relate the information of which remote device is the CE among the control link of which terminal point is this PE and the information which is generated by the section 300 for setting a tunnel such that the remote device is the PE which has the VPNDB 3010. In an example shown in FIG. 1, the control link C-B, C-F correspond to the neighboring control link in the VPNDB 3010 of the VPN #1. Here, the various information are the same as the neighbor control link information DB in the common DB 3009.

The control link information DB in the VPNDB 3010 is formed by a control link information which is contained in the neighboring control link information DB in the VPNDB 3010 and the control link information which is obtained by a link information exchanging section 3006 from other device via a control link which is contained in the neighbor control link information DB in the VPNDB 3010.

A route information DB in the VPNDB 3010 indicates from which control link the information should be transmitted of which beneficiary address is various device ID and a link IFID by using the control link information DB in the VPNDB 3010 such that the route information DB has a beneficiary address and transmitting IFID.

The link information setting section 1 sets the device ID for the link information, the link IFID, the remote device ID, and the remote IFID which are contained in the the neighboring data link information DB in the VPNDB 3010 and the neighbor control link information DB.

The PVNID setting section 3002 sets the VPNID which is contained in the neighboring data link information DB in the common DB 3009.

The filtering section 3003 extracts the data link information which has a specific VPNID among the data link information of the data link information DB of the common DB 3009 so as to instill to the corresponding VPNDB 3010.

The link information exchanging section 3003 exchanges the information with all of the remote devices which has the remote device ID of the control link which is contained in the neighbor control link information DB for the link information which is contained in the data link information DB and the control link DB so as to synchronize the information. That is, the link information exchanging section 3003 synchronizes the information such that the information has the same link set as that in the remote device.

The packet transmitting section 3008 refers to the route information DB so as to transmit the packet. Here, P has the common DB 3009, the link information setting section 3001, the VPNID setting section 3002, the link information exchanging section 3006, the route calculating section 3007, and the packet transmitting section 3008 among the members shown in FIG. 3.

Figure 4:
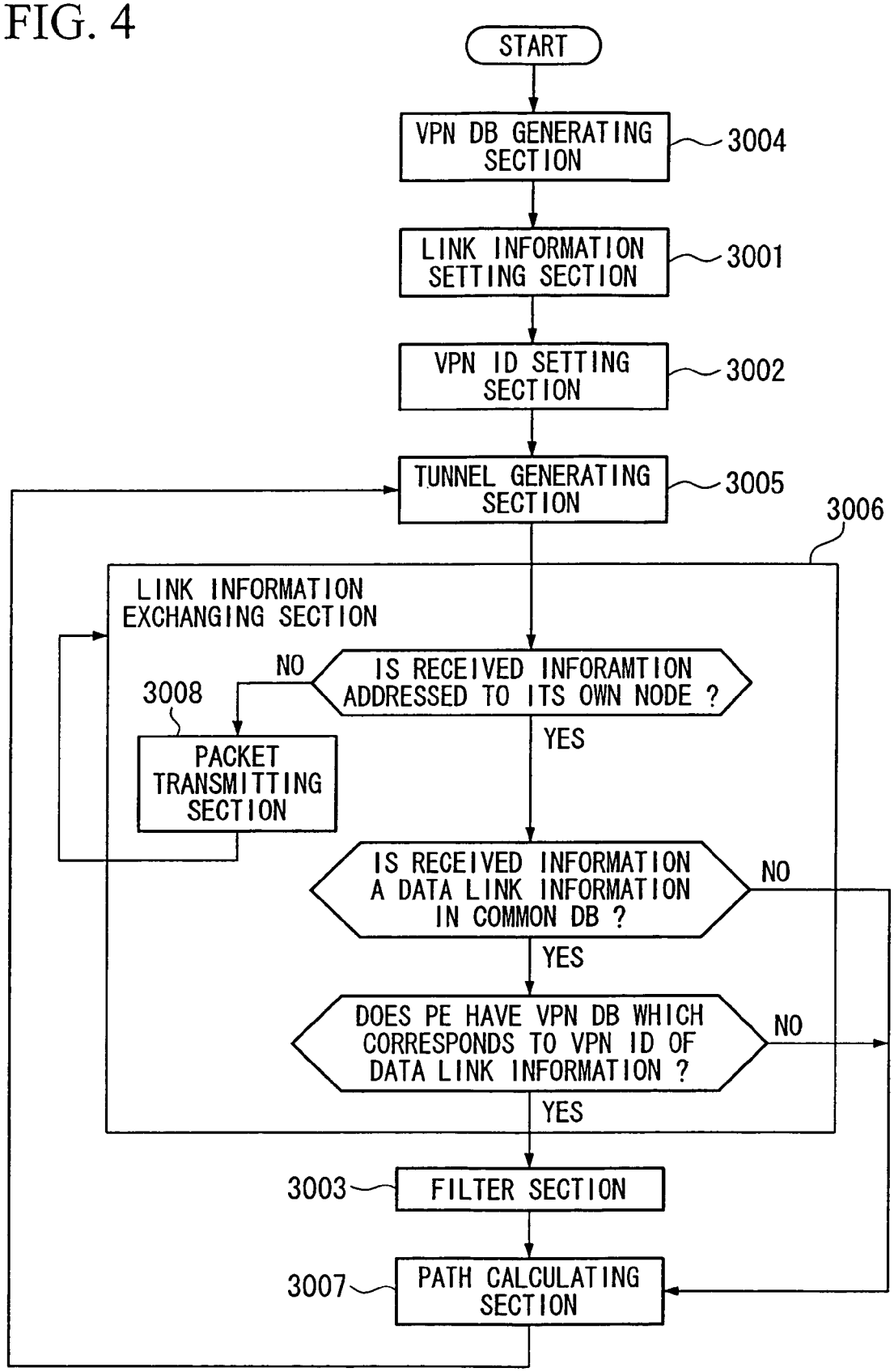
FIG. 4 is a series of flow for exchanging the link information in the PE.

FIG. 4 is a series of flow for exchanging the link information in the PE. At first, the VPNDB 3010 is generated by the VPNDB generating section 3004. Here, it depends on a contract, etc. in which PE the VPNDB 3010 is generated. The device ID, the link IFID, the remote device ID, and the remote link IFID which are contained in the common DB 3009, the neighbor link information DB in the VPNDB 3010, and the neighbor control link DB by the link information setting section 3001. Next, the VPNID of the neighboring data link information DB of the common DB 3009 is set by the VPNID setting section 3002. Next, a tunnel is generated by the section 3005 for generating a tunnel so as to be contained in the control link information DB in the VPNDB 10. Here, the tunnel is not established before the route information DB is generated; thus, in the beginning, only a setting operation is performed.

After that, the link information is transmitted to all of the remote devices which are contained in the neighbor control link information DB by the link information exchanging section 3006. Simultaneously, the link information is received from the remote device. In such a case, if the received link information is received not a node itself, the information passes through the tunnel. Therefore, further transmission is performed by the packet transmitting section 3008 according to the route information DB. On the other hand, if the received link information is received at the node itself and the received link information is obtained from the neighbor control link which is contained in the common DB 3009, the received link information is contained in the common data link information DB. Simultaneously, it is checked whether or not there is the VPNDB 3010 of the VPNID of the link information. If there is the VPNDB 3010 of the VPNID, the information is given to the VPNDB 3010 by the filtering section 3003. On the other hand, if the received link information is other data link information or the control link information, the information is contained in the corresponding data link information DB or the control link information DB.

Furthermore, the route information DB id updated by the route calculating section 3007. By updating the path information, there is a case in which a tunnel may be established. Here, there may be a method for adding an ID in an only DB so as to select the information selectively according to the ID instead of having separate DB from the VPNDB generating section 3004 and the common DB 3009 and the VPNDB 3010.

Also, there may be a method for providing a section for realizing the exchange of the information between the devices which are not connected directly instead of generating the tunnel by the section 3005 for generating a tunnel and exchanging the information by the tunnel.

Figure 5:
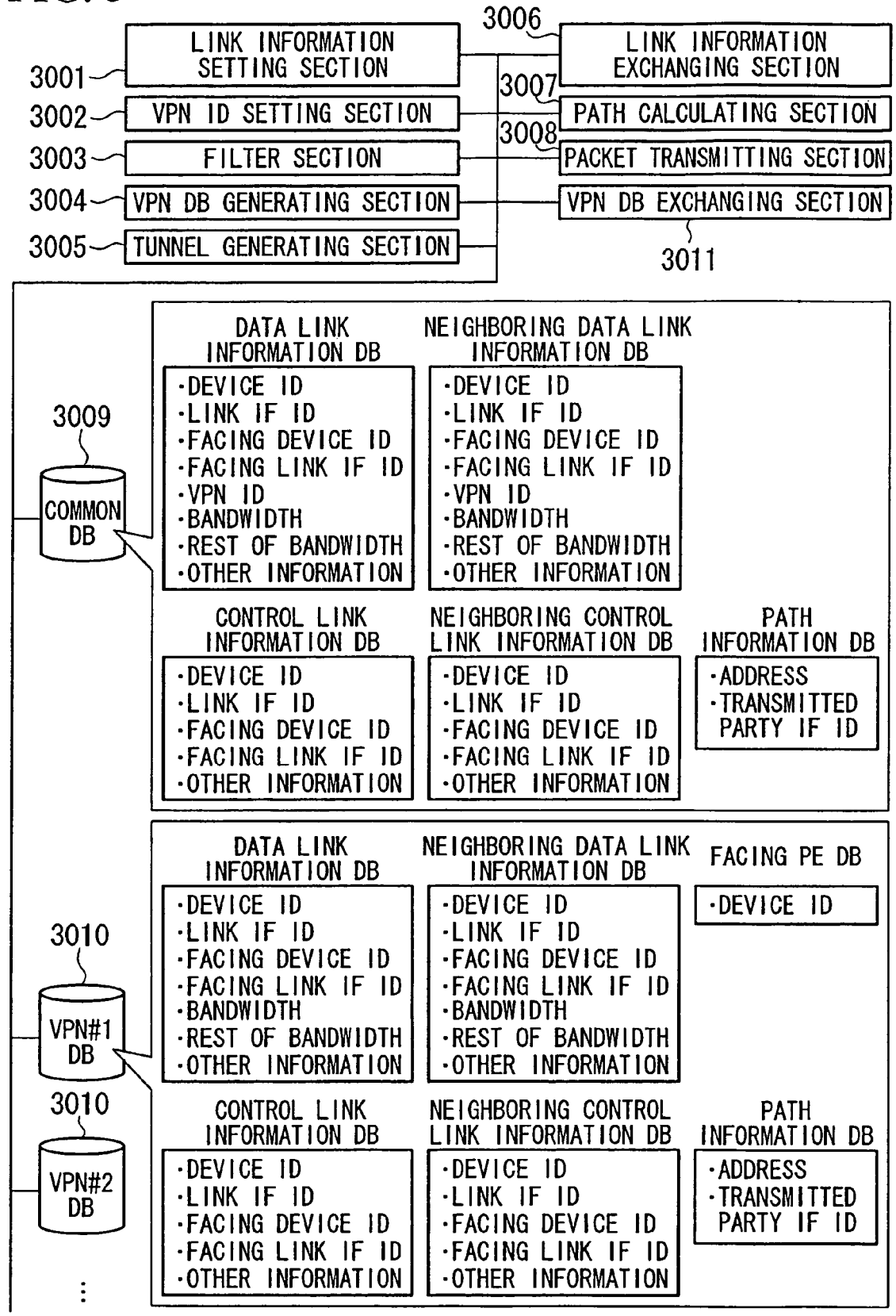
FIG. 5 is a view for showing a structure for a PE which is provided with a VPNDB exchanging section.

Next, with reference to FIG. 5, a method is explained for obtaining which PE and the tunnel should be generated automatically by providing the VPNDB exchanging section 3011 for notifying to which VPN the VPNDB 3010 which relates to the PE. In FIG. 5, the VPNDB exchanging section 3011 and the remote PEDB are added in the PE as compared to FIG. 3.

The VPNDB exchanging section 3011 exchanges the information with the rest of the PEs so as to obtain which PCNDB 3010 exists in which PE and contain the device ID of the PE which has the VPNDB 3010 of a certain VPN from the obtained information in the remote PEDB in the VPNDB 3010. For example, it is possible to realize it by installing a server and exchanging the information between each PE and the server.

Figure 6:
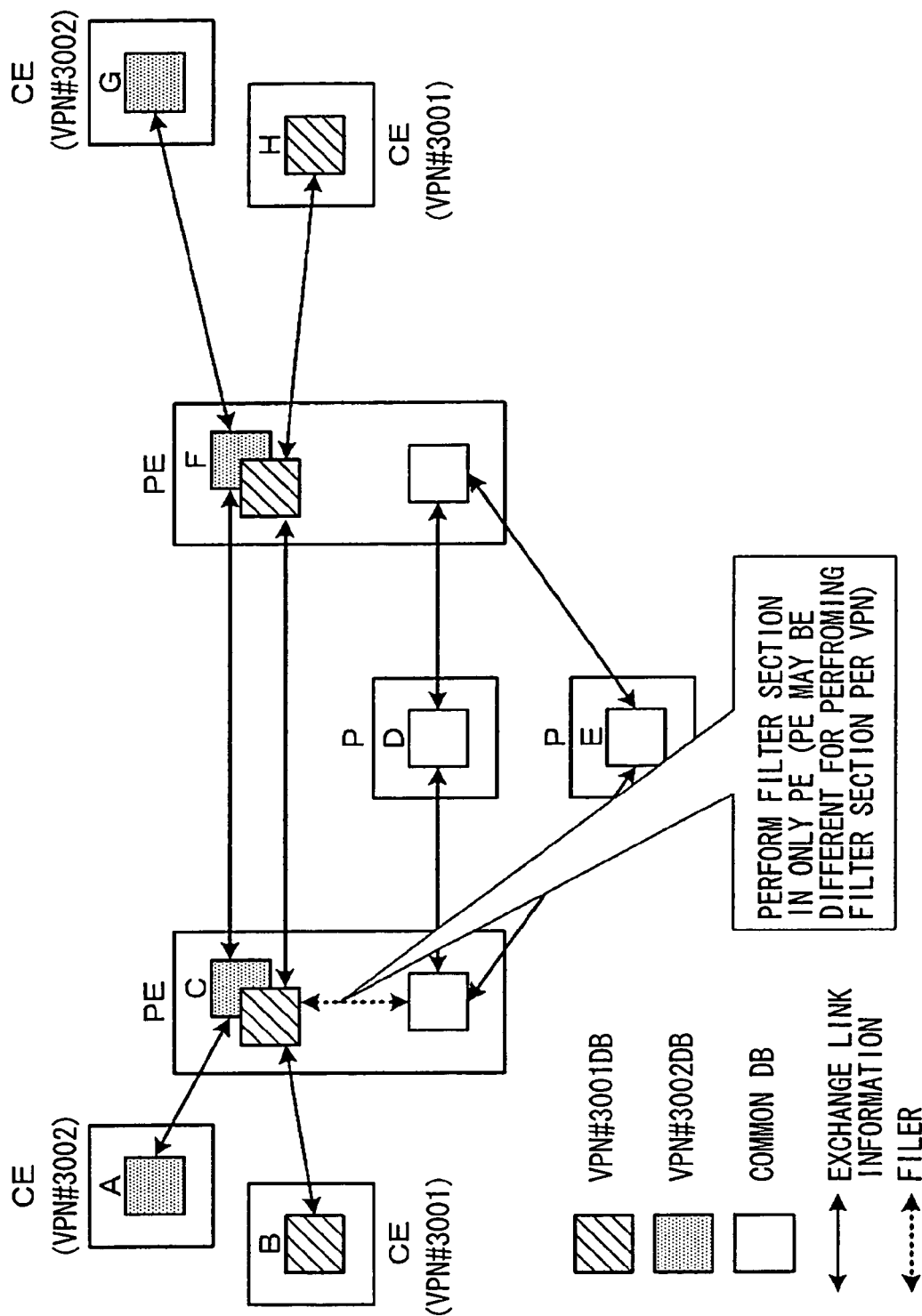
FIG. 6 is a view for a flow of exchanging information during an operation by a filtering section in an sole PE.

Also, it may be feasible that processes may be performed in which the data link information which has a specific VPNID is extracted from the common DB 3009 by the filtering section 3003 so as to instill the data link information DB in the VPNDB 3010 by only one PE. In such a case, it is acceptable if the PE for executing the filtering section 3003 is different for each VPN. A flow for exchanging information in this case is shown in FIG. 6.

Figure 7:
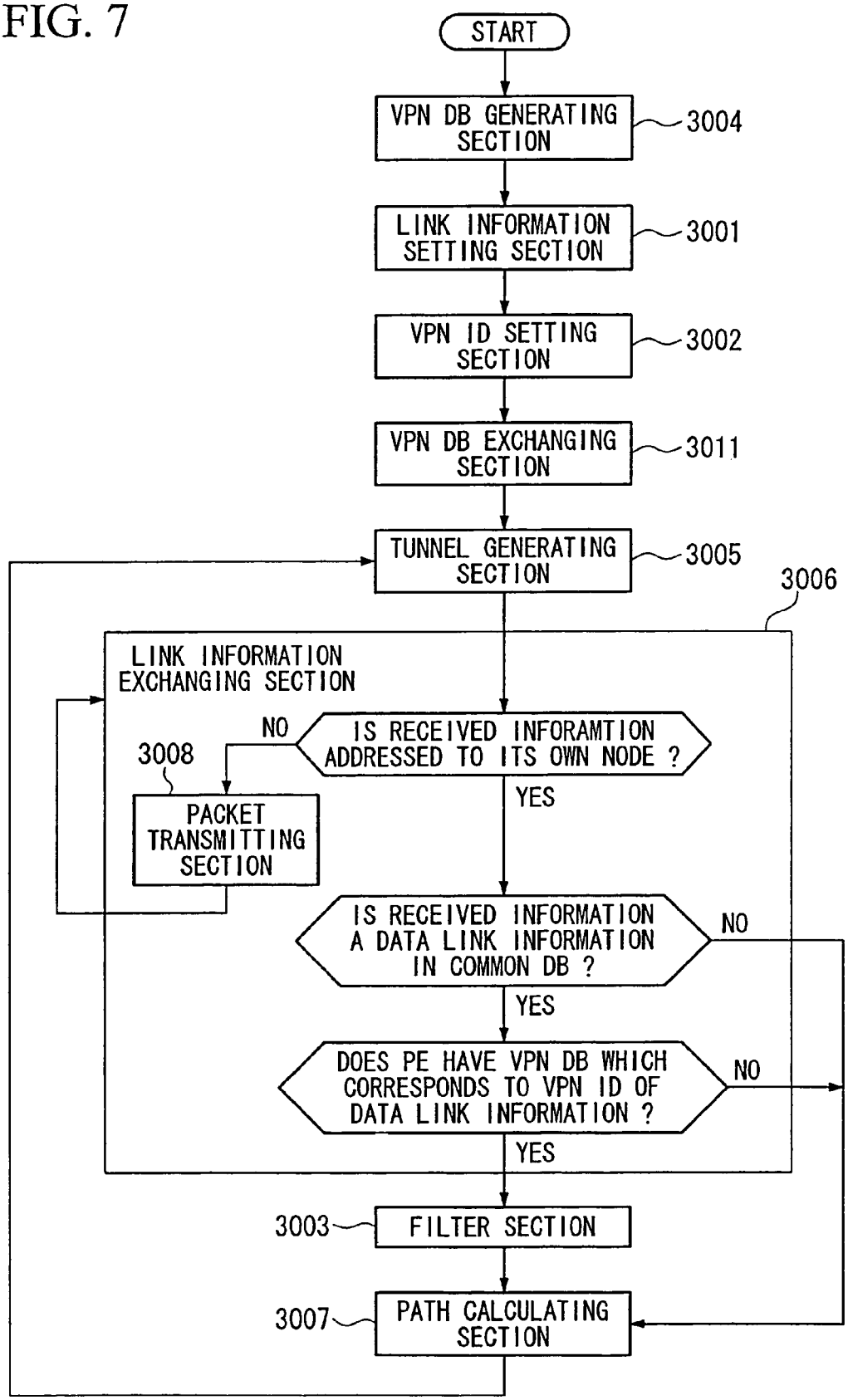
FIG. 7 is a view for an automation for generating a tunnel during an operation by a filtering section in an sole PE.

If there is only one PE for executing the filtering section 3003 in the network in this way, it is possible to automate the setting operation for the tunnel by the PVNDB exchanging section 3011. Steps for such a case are shown in FIG. 7. As shown in FIG. 7, all of the PEs share a fact for which VPNDB 3010 exist in which PE by the VPNDB exchanging section 3011. Also, in such a case, it is determined in which PE the filtering section 3003 is executed. For example, it is understood that the PE which has the hash value for the value of the device ID+VPNID and has the largest value executes the filtering section 3003.

The section 3005 for setting a tunnel generates the tunnel if the PE itself executes the filtering section 3003 for all of the PEs. The section 3005 for setting a tunnel generates the tunnel if the PE itself does not execute the filtering section 3003 for only the PE which executes the filtering section 3003. By doing this, a tunnel is formed in a star manner which has PE as a peak for performing the filtering section 3003; thus, a continuity for all of the PEs is maintained, and it is possible to maintain the same link information by the VPNDB 3010 in all of the PEs.

Figure 8:
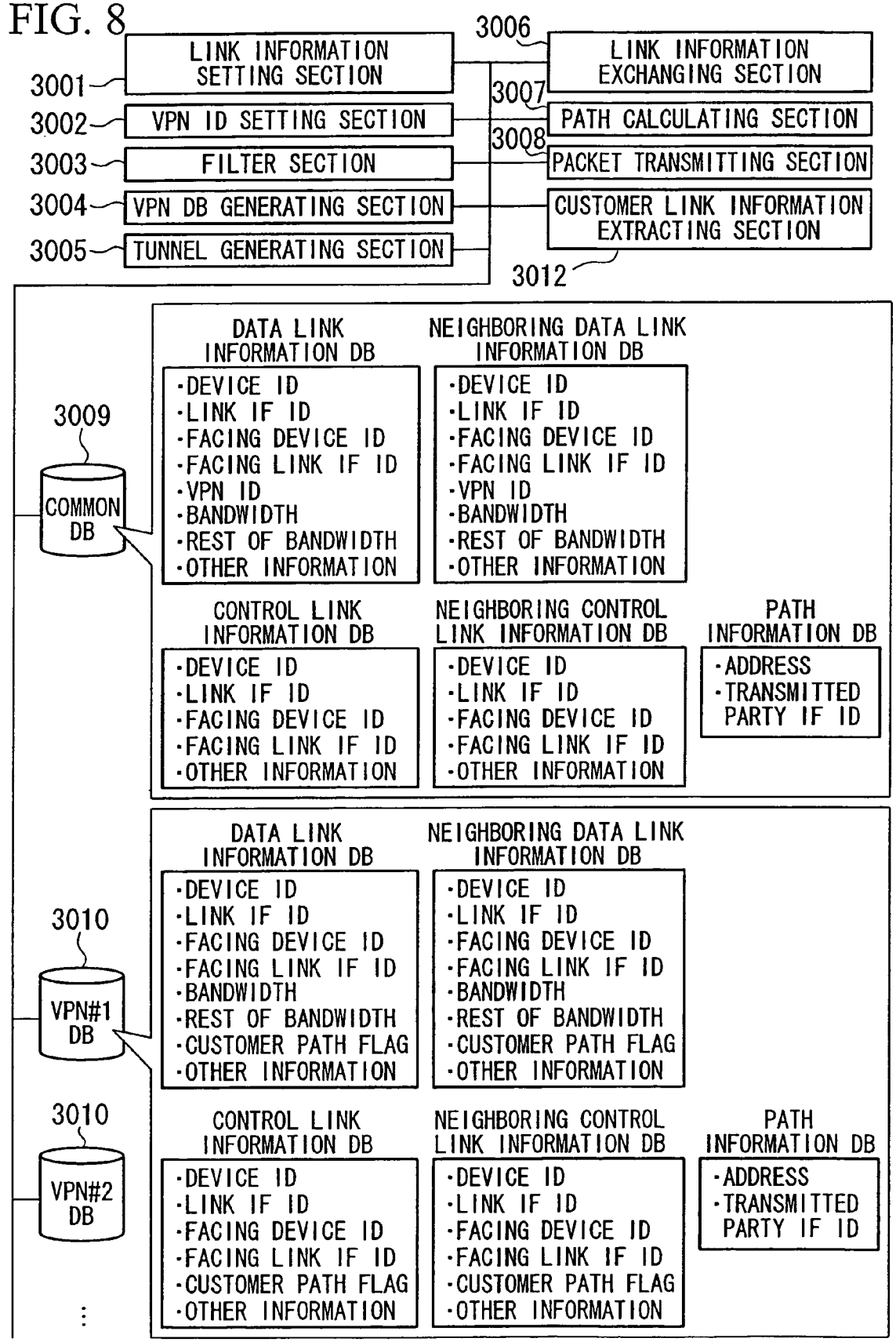
FIG. 8 is a view for showing a structure for a PE which is provided with a customer link information extracting section.

FIG. 8 is a view for showing a structure for a PE which is provided with a customer link information extracting section 3012. It is possible to reduce an amount of exchanged information in the link information DB in the DB for each VPN by providing the customer link information extracting section 3012 which extracts only the link information which is received from the Ce and exchanging only the information which is extracted by the customer link information extracting section 3012 for the PE or the other CE. Here, in which case, it is understood that all of the PEs should execute the filtering section 3.

In FIG. 8, as compared to FIG. 3, the customer link information extracting section 3012 and the customer route flag are added to the data link information, the neighboring data link information, the control link information, and the neighbor control link information in the VPNDB 3010.

A flag is set in the customer route flag in the neighboring data link information DB and the neighbor control link information DB if the remote device ID is the CE. A flag is set in the customer route flag in the data link information DB and the control link information DB if the remote device of the control link which receives the information by the link information exchanging section 3006 is the CE.

The customer link information extracting section 3012 extracts the data link information and the control link information in which the customer flag is set. The link information exchanging section 3006 exchanges all the link information with the data link information in which the customer route flag in the VPNDB 3010 is set when the exchanging remote device is the CE. Here, the entry of the customer route flag is deleted when the transmission is performed from the PE; thus, the customer route flag is set when it is received at the PE. Also, if the exchanging remote device is PE, the data link information in which the customer route flag which is obtained by the customer link information extracting section is set and the control link information are exchanged while the customer route flag is set.

Figure 9:
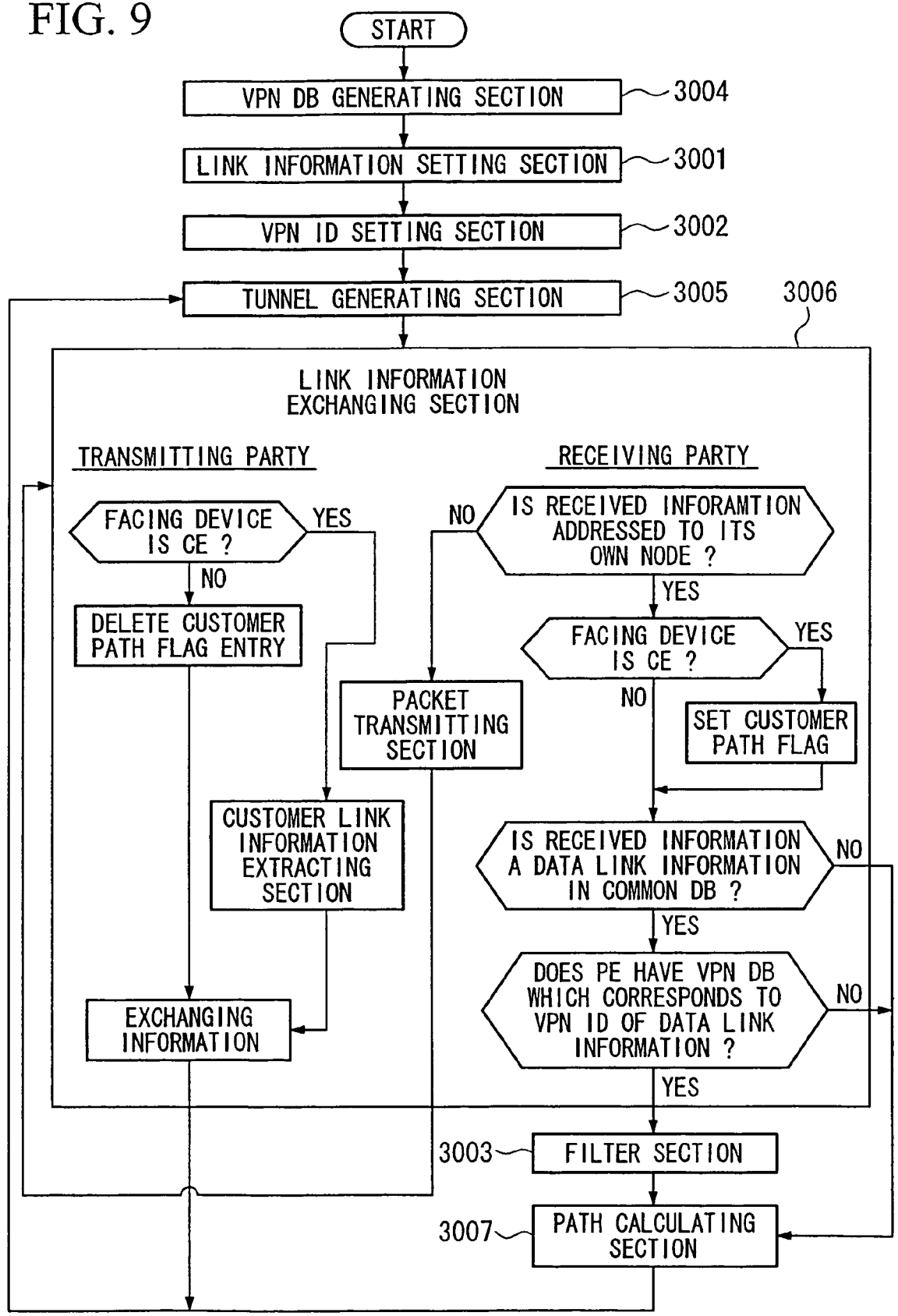
FIG. 9 is a view for showing a structure for exchanging the link information in the PE which is provided with a customer link information extracting section.

FIG. 9 is a view for showing a structure for exchanging the link information in the PE which is provided with a customer link information extracting section 3012. The neighboring data link information DB of the VPNDB 3010 and the customer route flag in the neighbor control link information DB are set in advance. The link information exchanging section 3006 is operated as explained above.

Figure 10:
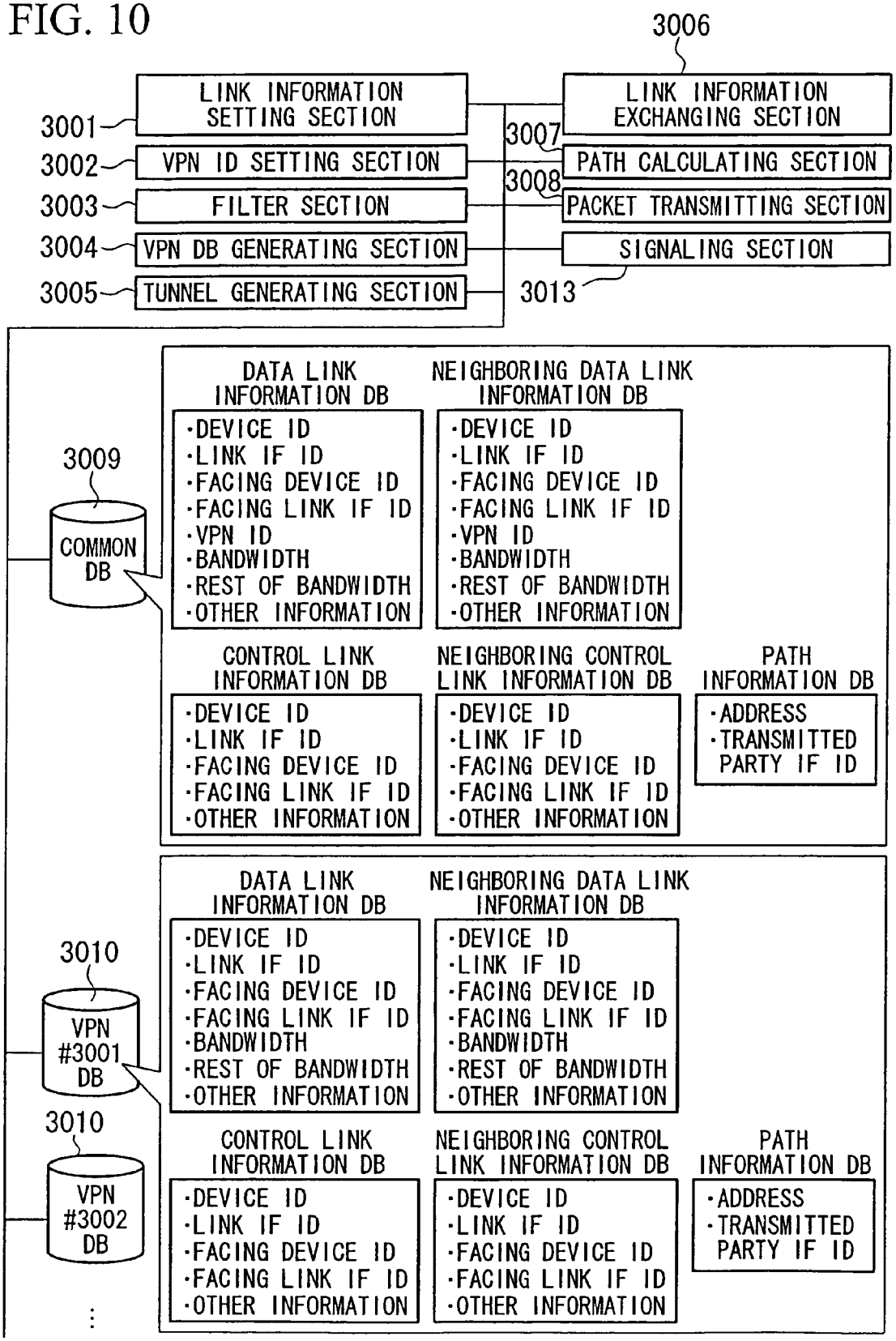
FIG. 10 is a view for showing a structure for a PE which is provided with a signaling section.

FIG. 10 is a view for showing a structure for a PE which is provided with a signaling section 3013. As compared to FIG. 3, a signaling section 3013 is added. The signaling section 3013 receives a path setting request fro the CE and secures a data link resource so as to transmit it to P as a next beneficiary which is contained in the path setting request or transmits a path setting request to the PE.

A hop information which should be pass via and a bandwidth which should be secured are contained in the path setting request. Here, the hop information may be a data link IFID. Alternatively, the hop information may be a device ID. If the signaling section 3013 receives the path setting request from the CE, the signaling section 3013 refers to the data link information DB on the VPNDB 3010 of the VPN to which the CE belongs and retrieves the PE which neighbors the CE which is designated as a beneficiary address. Consequently, a route until the PE which is retrieved by the device itself is extracted among the hop information which should be pass by which is contained in the path setting request. This route information, the bandwidth which should be secured and contained in the path setting request, and a new path setting request which contains the VPNID are generated. The new path setting request sets a path between the PEs.

The new path setting request is transmitted by using the route information DB of the common DB 3009. At first, the device which should be transmitted next from the data link IFID which should be pass by is extracted so as to confirm to this device from the device itself whether of not it is possible to secure a bandwidth of which VPN is requested sufficiently by retrieving the neighboring data link information DB of the common DB 3009. If it is possible to secure sufficiently, an IFID for a transmission beneficiary for the next device to which it should be transmitted from the route information DB of the common DB9; thus, the path setting request is transmitted.

If a path is disposed between the PEs, the PE transmits an initial path setting request to the PE which is connected to the CE which is designated as a beneficiary address. If the PE which is connected to the CE which is designated as a beneficiary address receives the path setting request, the PE transmits the path setting request to the CE.

Here, if the value for the bandwidth of the data link information is changed, the remote device and the link information are synchronized by the link information exchanging section 3006.

Figure 11:
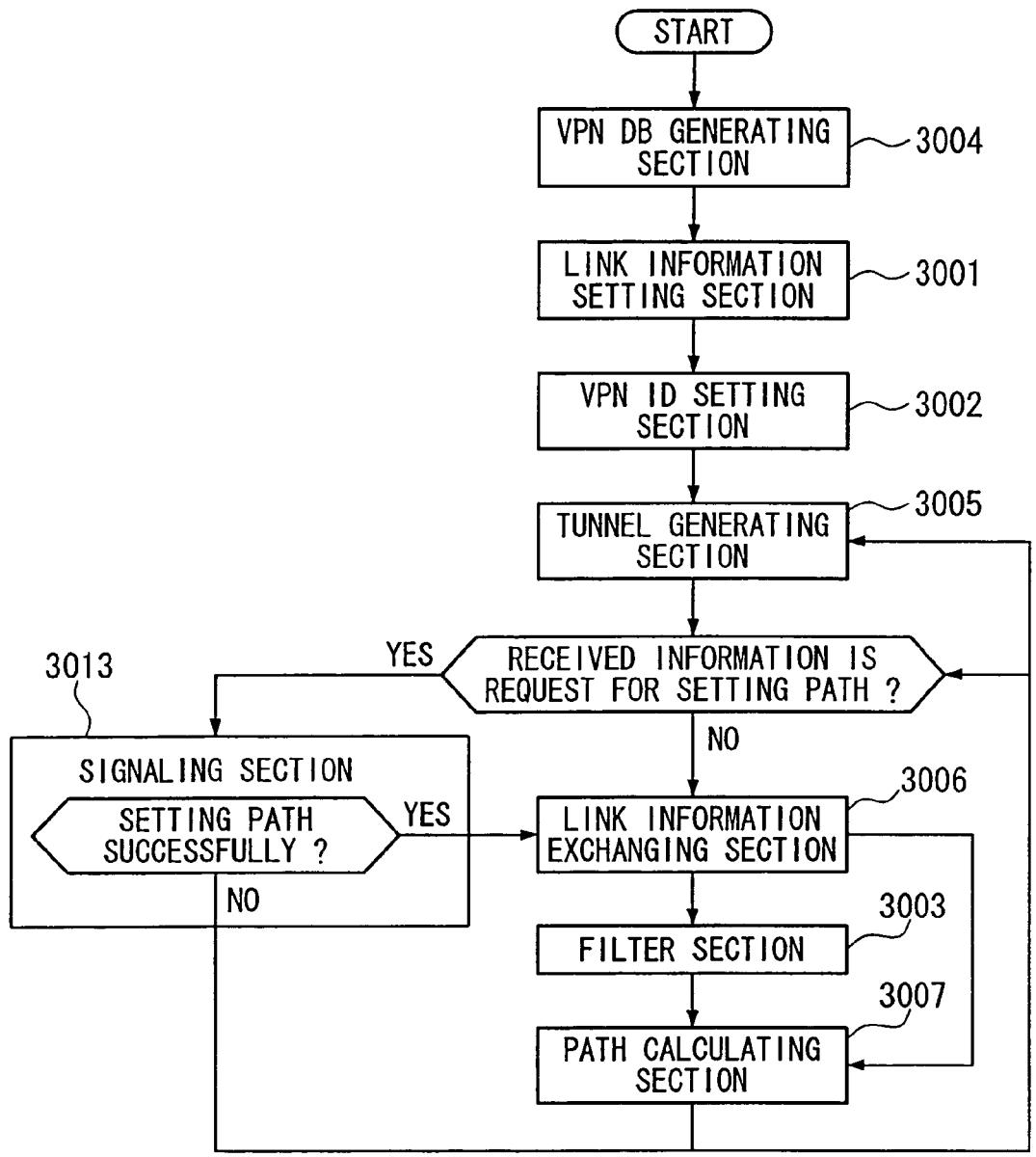
FIG. 11 is a view for showing steps for setting a path in a PE which is provided with a signaling section.

FIG. 11 is a view for showing a setting steps for a path in which a signaling section 3013 is provided. If a path is successfully set, the information is updated by the link information exchanging section 3006.

In the present invention, it is possible to realize a program for realizing a function which corresponds to the VPN communication controlling device of the present invention in the information processing device by installing it in a commonly used information processing device. This program can realize functions which correspond to the link information setting function 3001, the VPNID setting section 3002, the filtering section 3003, the VPNDB generating section 3004, the section 3005 for setting a tunnel, the link information exchanging function 3006, the path calculating function 3007, the packet transmitting section 3008, the common DB 3009, the CPNDB 3010, the VPNDB exchanging section 3011, the customer link information extracting function 3012, and the signaling section 3013 for the information processing device if the program is recorded in the recording medium so as to be installed in the information processing device or the program is installed in the information processing device via a communication network.

Furthermore, a second embodiment of the present invention is explained with reference to drawings.

Figure 12:
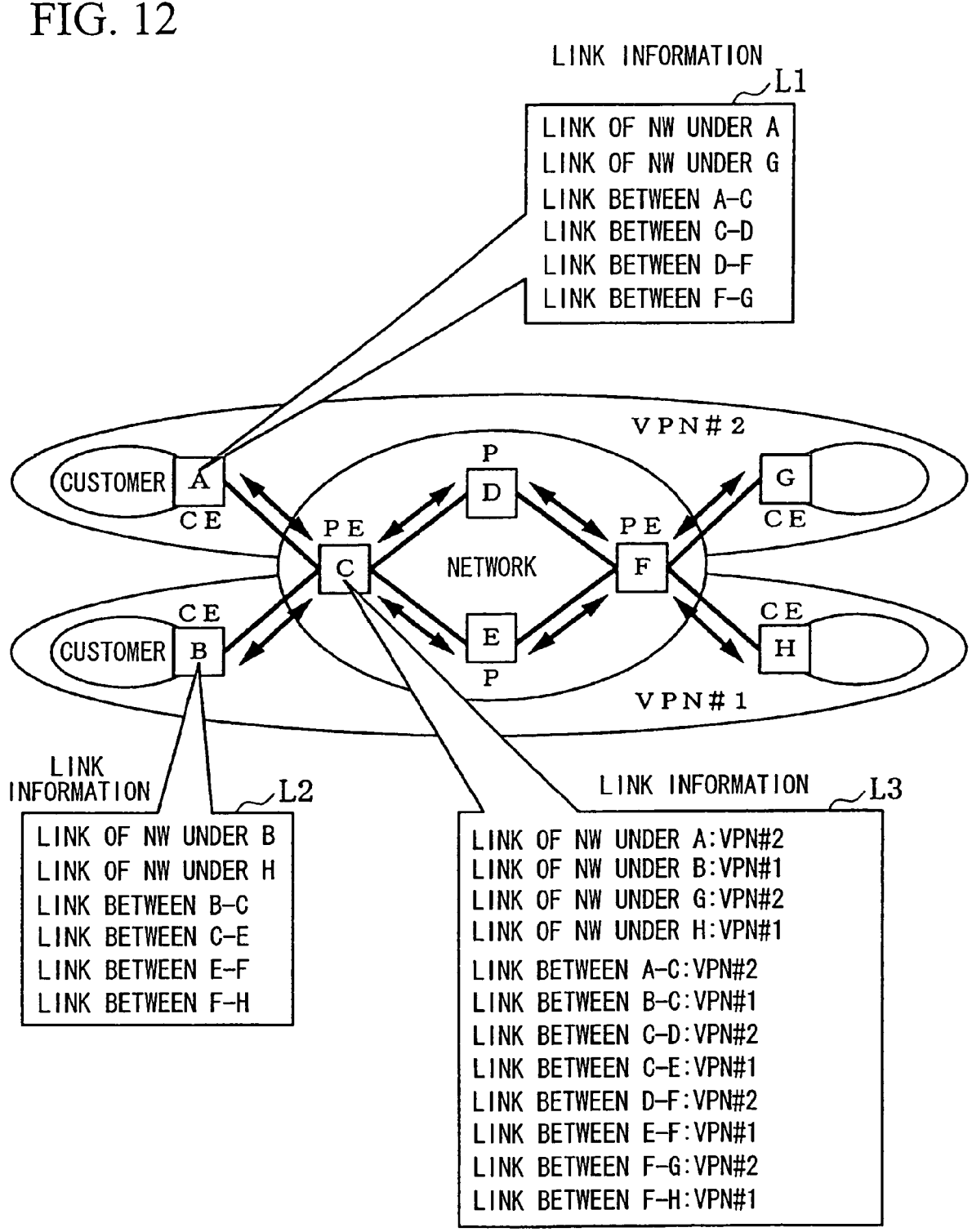
FIG. 12 is a view for exchanging the link information for the VPN.

FIG. 12 is a view for exchanging the link information between the devices which form the network. In the drawings, the PE (Provider Edge) indicates an edge device in a network. P indicates a device in the network. CE (Customer Edge) indicates a customer edge device. The edge device in a network is connected to at least a customer edge device. On the other hand, the device in a network is not connected to the customer edge device.

When the link information L1, L2 are sent to the edge device C in the network from the customer edge devices A, B, the VPN ID (VPN #1, VPN #2, etc.) is added in the edge device C in the network according to the link information L3 which belongs to the customer edge device. Also, the VPN ID is set for the link information in the device in a network. In the network, the link information is exchanged to which the VPN ID is added. On the other hand, when the link information L3 is sent to the customer edge devices A, B, G, and H from the devices C, F in the network, only the link information which has the VPN ID which is identical to the VPN IDs in the customer edge devices A, B, G, and H is extracted from the link information L3 so as to be sent to the edge devices C, F in the network. Here, the VPN #1 and the VPN #2 which are shown in FIG. 1 indicate ranges to which specific link information belong respectively.

Figure 13:
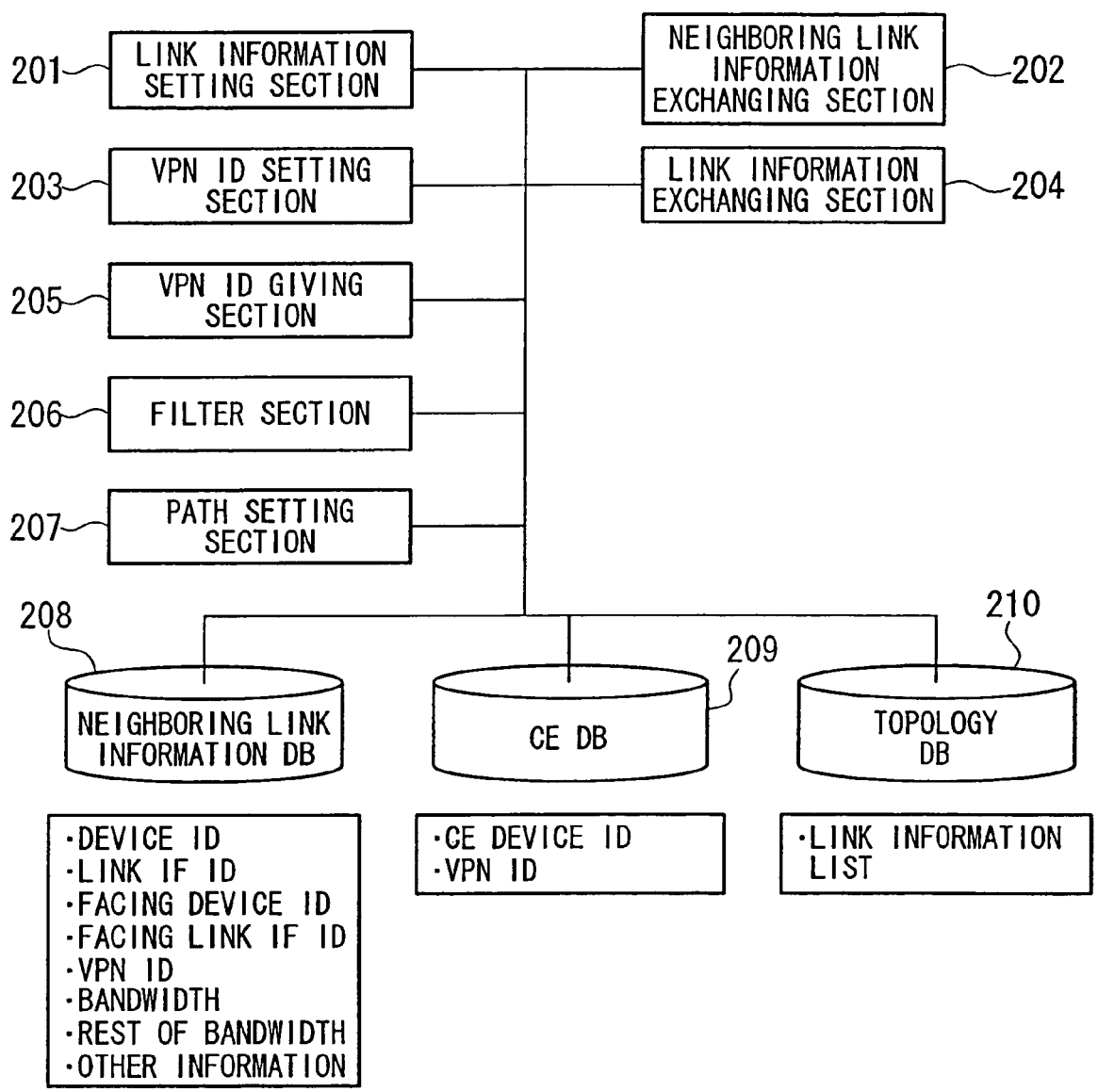
FIG. 13 is a view for showing a structure for an edge device in a network.

FIG. 13 is a view for structures of the edge devices C, F in a network.

The neighbor link information DB 208 is a DB for maintaining various information of the link which is connected to the edge devices C, F in the network. Here, various information indicates as follows. The device ID indicates IDs of the customer edge device, the edge device in the network, and the device in the network. The link IF (Interface) ID indicates an IF ID of the link in the customer edge device, the edge device in the network, and the device in the network. The remote device ID indicates an ID of the remote device of the link. The remote link IF ID is an IF ID of the link in the remote device of the link. The VPN ID is an identifier which indicates to which VPN the link belongs. The bandwidth indicates the link. The rest of the bandwidth indicates a rest of the bandwidth which can be used. In addition, there are sequence number, and a time until it is abandoned.

For example, if the link between the customer edge device A and the edge device C in the network in FIG. 12 is taken for an example, the device ID in the edge device C in the network is indicated as C. The link IF ID is indicated as CA-1. The remote device ID is indicated as A. The remote link IF ID is indicated as AC-1. The VPN ID is indicated as VPN #2. The bandwidth is 10 Mbps. The rest of the bandwidth is 90 Mbps.

Here, the VPN ID is not added to the ordinary link information L1, L2 which are sent from thte customer edge devices A, B, G, and H.

The CE DB 209 is a DB for maintaining various information of the customer edge devices A, B, G, and H when the edge devices C, F in the network are connected to the customer edge devices A, B, G, and H by at least a link in which is contained in the neighbor link information DB 208. Here, various information are indicates as follows. The CE device ID indicates the device IDs for the customer edge devices A, B, G, and H. VPN ID indicates an identifier for indicating to which VPN the customer edge devices A, B, G, and H belong.

If the customer edge device A is taken for and example, data are as follows such that the CE device ID is indicated by A. VPN ID is indicated by VPN #2.

A topology DB 210 is a DB which is obtained by the link information exchanging section 204 for maintaining the link information for an entire network. Here, the various link information has information such as the device ID, the link IF ID, the remote device ID, the remote link IF ID, the VPN ID, the bandwidth, the rest of the bandwidth, etc.

Here, the link information in the neighbor link information DB 208 may be in various forms such as a form all of which are contained in the topology DB 210. Also, there may be a case in which the link information is not contained in the neighbor link information DB 208 at all. In any forms, an entire set for the link information in the device is called as an entire link set.

For example, in FIG. 1, an entire set for the link information which relates to all the links for A-C, B-C, C-D, C-E, D-F, E-F, F-G, and F-H are called as an entire link set.

The link information setting section 201 sets the device ID of the link information which is contained in the neighbor link information DB 208 and the link IF ID.

The VPN ID setting section 203 sets the VPN ID which is contained in the neighbor link information DB 208.

The VPN ID adding section 205 which is executed for the link information which is sent from the customer edge devices A, B, G, and H so as to refer to the CE DB 209 extracts the VPN ID of the entry which has a corresponding CE device ID and adds this VPN ID to the link information.

The filtering section 206 is executed when the link information is transmitted to the customer edge devices A, B, G, and H so as to extract the VPN ID of the entry which has the CE device ID of the customer edge devices A, B, G, and H from the CE DB 209 and select only the link information from the entire link set.

The neighbor link information exchanging section 202 exchanges the information for the link information which is contained in the neighbor link information DB 208 with the remote device and obtain the remote link IF ID so as to set a value in the neighbor link information DB 208.

The link information exchanging section 204 exchanges the entire link set with all of the remote devices which have the remote device ID which is contained in the neighbor link information DB 208 so as to synchronize the information. That is, the information is synchronized so as to have the entire link set which is identical to the remote device. Here, if the remote device is the customer edge devices A, B, G, and H, the VPN id is added to the link information which is transmitted from the customer edge devices A, B, G, and H by using the VPN ID adding section 205. After that, the link information is stored in the topology DB 210. On the other hand, if the link information is transmitted to the customer edge devices A, B, G, and H, the VPN ID is removed from only the link information which is obtained from the filtering section 206. After that, the link information is transmitted to the customer edge devices A, B, G, and H, so as to synchronize the information.

The path setting request 207 receives the path setting request from the customer. The path setting request contains a transmitting customer edge device ID, a beneficiary customer edge device ID, a list for the device ID on a route which should be passed by, and the bandwidth. In addition, there is a case in which the IF ID of the link which should be passed by may be contained. If the IF ID of the link is contained, the link which should be used between the devices is designated. If the IF ID of the link is not contained, it is determined which link should be used in each device.

If the path setting request is received and the link IF ID is contained in the set path the corresponding link is selected from the neighbor link information DB 208. If the link IF ID is not contained, a next device is calculated from the list of the device ID on a route which should be passed by. Thus, an appropriate link is selected among this information according to the neighbor link information DB 208. Simultaneously, the path setting request is transmitted to the remote device which is contained in the neighbor link information DB 208 according to the information which is contained in the path setting request. Here, in such a case, if the bandwidth which is contained in the path setting request is not secured, the path setting request is not transmitted to the remote device. An error information such that the bandwidth cannot be secured is transmitted reversely on a route on which the path setting request has been transmitted.

If the path setting request reaches at the beneficiary customer edge device, an information which contains a successful context is transmitted reversely on the same route. If this information is received, each device change the value of the bandwidth of the entry of the link in the neighbor link information DB 208 according to the information which is contained in the path setting request.

Here, if the value for the link information is changed, the remote device and the link information are synchronized by the link information exchanging section 204.

Here, in a structure of FIG. 2, the devices in a network D, E have a structure which has sections and a DB except the CE DB 209, the filtering section 206, and the ID adding section 205.

Figure 14:
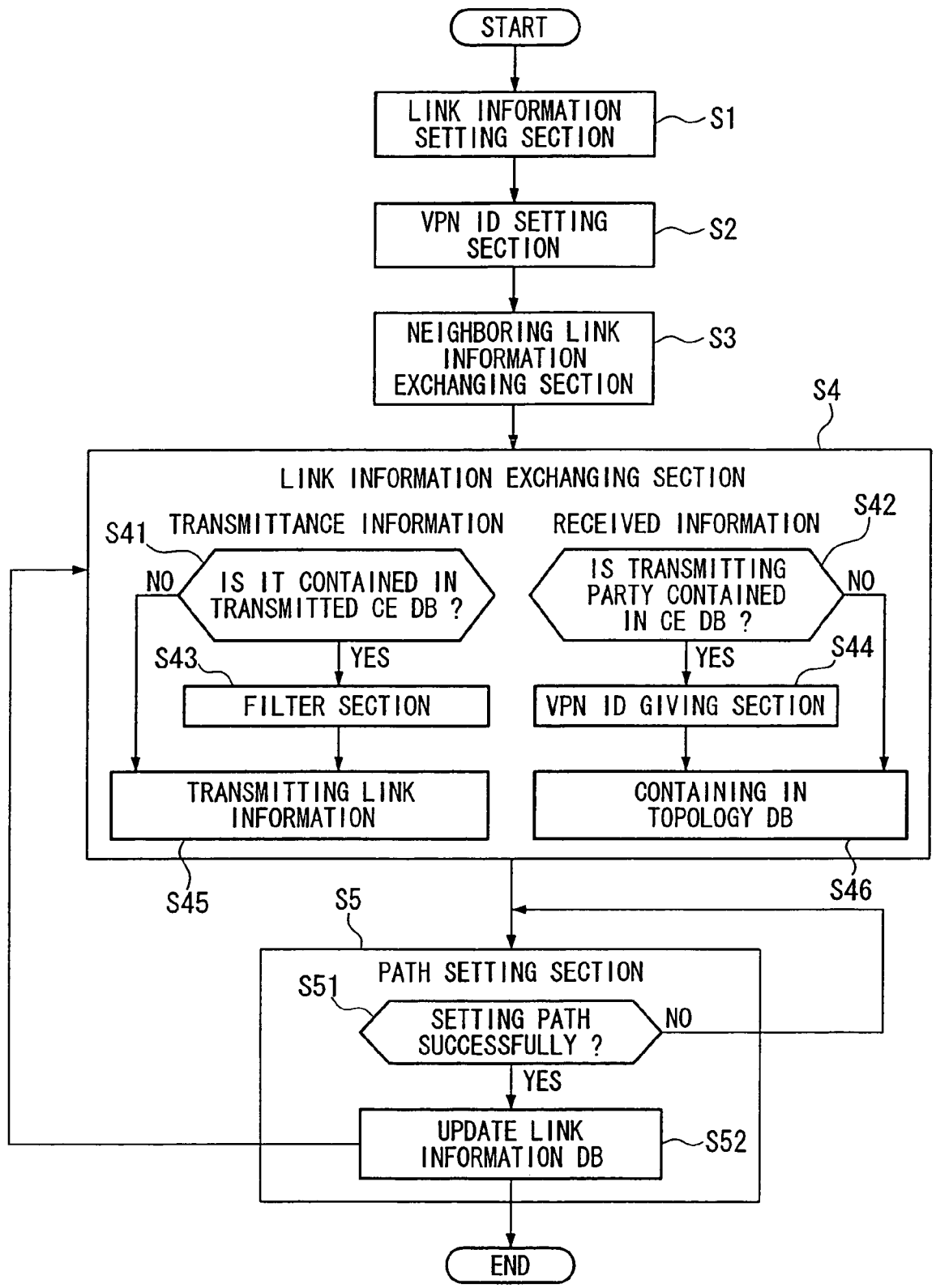
FIG. 14 is a series of flow for exchanging the link information in the edge device in a network.

FIG. 14 is a flow chart for showing a series of exchanging the link information.

The edge device C in a network in FIG. 1 is taken for an example for explanation. Here, it should be understood that the CE DB 209 be constructed before the link information is exchanged.

(Step S1) At first, the device ID, link IF ID of the neighbor link information DB are set by the link information setting section 201.

For example, as the device ID, CA-1, CB-1, CD-1, and CE-1 are set for the link IF IDs.

(Step S2) Next, the VPN ID of the neighbor link information DB 208 is set by the VPN ID setting section 203. For example, it is set such that VPN ID for the link IF ID=CA-1 is set as the VPN #2, the VPN ID for the link IF ID=CD-1 is set as the VPN #1, the VPN ID for the link IF ID=CE-1 is set as the VPN #1.

(Step S3) Consequently, the remote device ID, the remote link IF ID of the neighbor link information DB 208 are set by the neighbor link information exchanging section 202.

For example, it is set as follows.

The remote device ID for the link IF ID=CA-1 is set as A. The remote link IF ID is set as AC-1.

The remote device ID for the link IF ID=CB-1 is set as B. The remote link IF ID is set as BC-1.

The remote device ID for the link IF ID=CD-1 is set as D. The remote link IF ID is set as DC-1.

The remote device ID for the link IF ID=CE-1 is set as E. The remote link IF ID is set as EC-1.

(Step S4) After that, the all of the link information is transmitted to all of the remote devices which are contained in the neighbor link information DB 208 by the link information exchanging section 204. Simultaneously, all of the link information is received from the remote device. In such a case, if the remote device is contained in the CE DB 209 (step S41, S42), the filtering section 206 is used for transmitting information, and the VPN ID adding section 205 is used for receiving the information (step S43, S44). After the information is modified, a transmitting operation/receiving operation are performed (step S45, S46).

For example, in FIG. 1, the above data which relates to all of the link for the A-C, B-C, C-D, C-E, D-F, E-F, F-G, and F-H are transmitted and received.

(Step S5) After that, if the path setting request is issued from the customer, a processing operation is performed in the path setting section. If a path is set successfully, the neighbor link information DB 208 is updated. The updated link information is transmitted to the remote device by the link information exchanging section 204.

For example, if the path setting request is performed under condition that the transmitting customer edge device ID from the customer edge device A=A, the beneficiary customer edge device ID=G, a route which should be passed by=(C, D, F), and the bandwidth=10 M, the path setting request reaches to the device G via the devices C, D, F. Simultaneously, the information which contains a context such that the path setting request is successful is transmitted to the device A via F, D, C from the device G. The rest of the bandwidth of the link AC-1 of the neighbor link information DB 208 in the devices A, C is reduced by 10 M so as to be updated. The updated link information is transmitted by the link information exchanging section 204. It is similar to cases for the link CD-1, DF-1, and FG-1.

Here, it is possible to use the OSPF or a GMPLS enlarging OSPF for the link information exchanging section 204 shown in FIG. 13 according to the present invention.

Also, it is possible to set a plurality of values for the VPN ID of the neighbor link information DB 208 shown in FIG. 13. If there are a plurality of VPN IDs, identical link information are selected for the customer edge devices A, B, G, and H which have different VPN IDs; therefore, it is possible to provide the identical link information to different customers.

Figure 15:
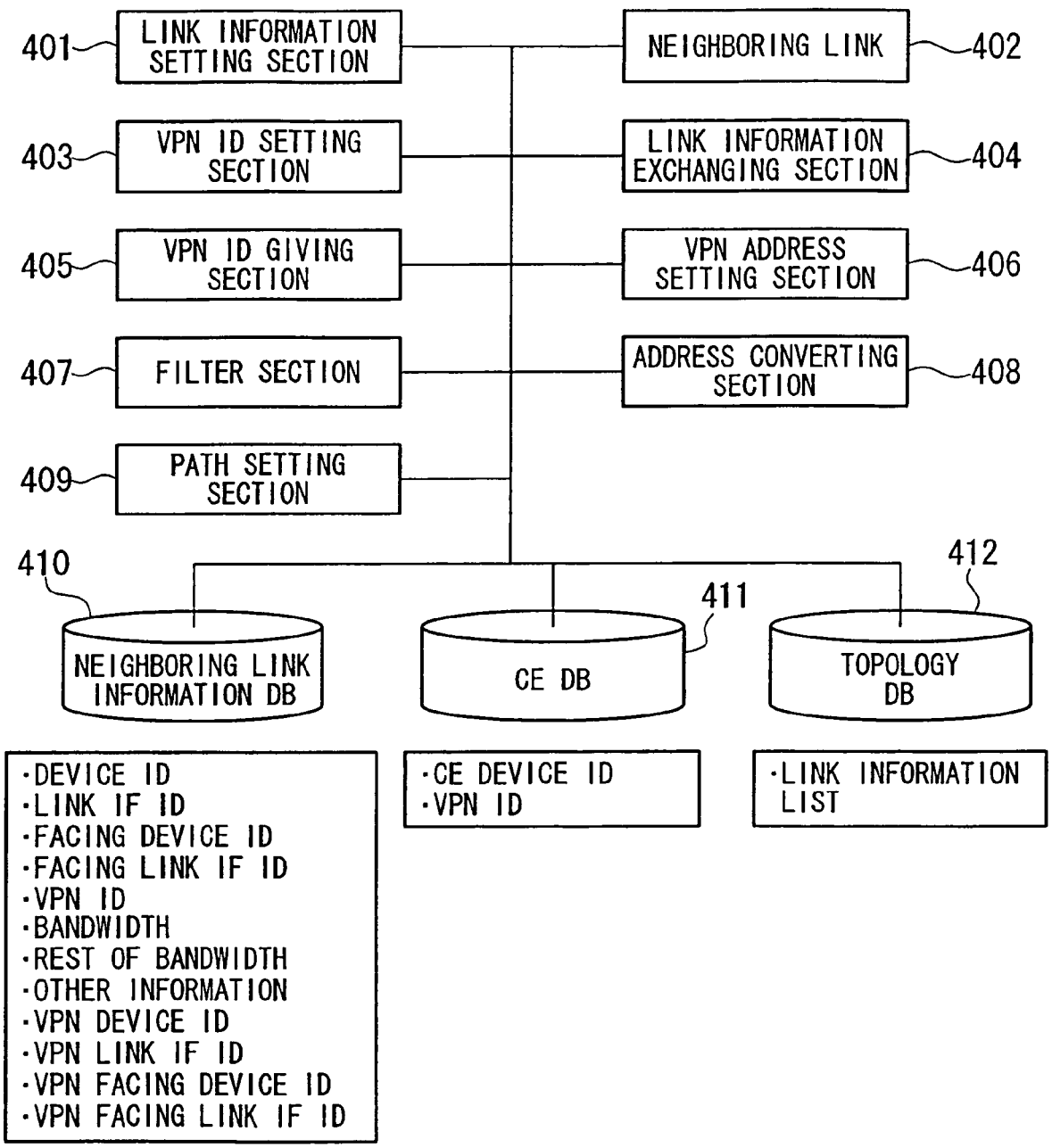
FIG. 15 is a view for showing a structure for an edge device in a network in which it is possible to convert the address.

Next a method is explained such that it is possible to design an independent address for each VPN by adding an VPN address setting section 406 for setting a link address and a node address for each VPN and an address converting section 408 for converting the link address and the node address which are common in all of the VPNs to the link address and the node address for each VPN for the edge device in a network which is shown in FIG. 13 with reference to FIG. 15.

In FIG. 15, the VPN device ID, the VPN link IF ID, the VPN remote device ID, and the VPN remote link IF ID are added in the neighbor link information DB 410 which is shown in FIG. 15. Here, it is indicated as follows. The VPN device ID indicates a value for each VPN of the device ID. The VPN link IF ID indicates a value for each VPN of the link IF ID. The VPN remote device ID indicates a value for each VPN of the device ID. The VPN remote link IF ID indicates a value for each VPN of the remote link IF.

The VPN address setting section 406 sets the VPN device ID, and the VPN link IF ID of the neighbor link information DB 410.

When the link information is transmitted to the customer edge devices A, B, G, and H, in the address converting section 408, in the link information exchanging section 404 converts as follows respectively. (1) the device ID of the link information is converted to the VPN device ID, (2) the link IF ID of the link information is converted to the VPN link IF ID, (3) the remote device ID of the link information is converted to the VPN remote device ID, (4) the remote link IF ID of the link information is converted to the VPN remote link IF IF. After the VPN device ID, the VPN link IF IF, the VPN remote device ID, the VPN remote link IF IF, the VPN ID are deleted, they are transmitted thereout.

Also, the VPN remote device ID, the VPN remote link IF ID are obtained in addition to the remote device ID, the remote link IF ID in the neighbor link information exchanging section 402 so as to set values in the neighbor link information DB 410. Here, the VPN remote device ID, the VPN remote link IF ID are not added to the link information from the CE; therefore the value of the remote device ID is used for the VPN remote device ID. Also, the value of the remote link IF ID is used for the VPN remote link IF ID.

Figure 16:
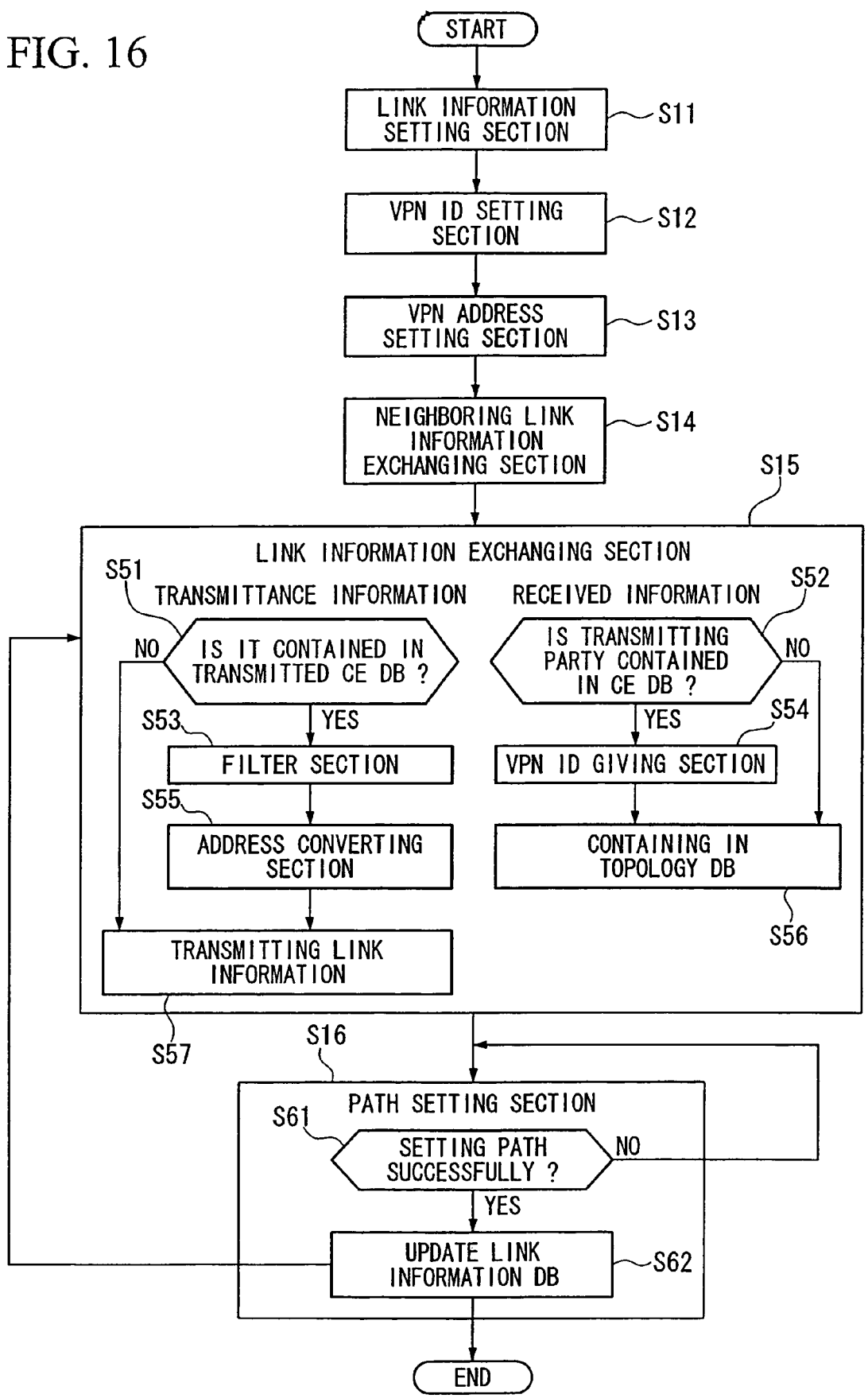
FIG. 16 is a series of flow for exchanging the link information in the edge device in a network for a case in which it is possible to convert the address.

FIG. 16 is a flow chart for showing a series of f exchanging the link information in the edge device in a network for a case in which it is possible to convert the address.

The edge device C in a network in FIG. 12 is taken for an example for explanation. Here, it should be understood that the CE DB 411 be constructed before the link information is exchanged.

(Step 11) At first, the device ID, link IF ID of the neighbor link information DB 410 are set by the link information setting section 401.

For example, C is set for the device ID, and CA-1, CB-1, CD-1, and CE-1 are set for the link IF IDs.

(Step 12) Next, the VPN ID of the neighbor link information DB 410 is set by the VPN ID setting section 403.

For example, it is set such that VPN ID for the link IF ID=CA-1 is set as the VPN #2, the VPN ID for the link IF ID=CD-1 is set as the VPN #1, the VPN ID for the link IF ID=CE-1 is set as the VPN #1.

(Step S13) Consequently, the VPN device ID and the VPN link IF ID are added to the neighbor link information DB410 by the VPN address setting section 406.

For example, it is set as follows. The device ID C, the link IF ID CA-1, and the remote device ID A are added to the device C. The VPN device ID VPN2-C, VPN link IF IF VPN2-CA-1, the device ID C, the link IF IF CB-1, and the remote device ID B are added to the remote link IF ID AC-1. The VPN device ID VPN1-C, the VPN link IF ID VPN1-CB-1, the device ID C, the link IF ID CD-1, and the remote device ID E are added to the remote link IF ID DC-1. The VPN device ID VPN2-C, the VPN link IF ID VPN2-CD-1, the device ID C, the link IF ID CE-1, and the remote device ID E are added to the remote ink IF ID DC-1. The VPN device ID VPN1-C, the VPN link IF ID VPN-CE-1 are added to the remote link IF ID EC-1.

(Step S14) Consequently, the remote device ID, the remote link IF ID, the VPN remote device ID, and the VPN remote link IF ID of the neighbor link information DB 410 are set by the neighbor link information exchanging section 402.

For example, it is set as follows.

In the link IF ID=CA-1, A is set for the remote device ID, AC-1 is set for the remote link IF ID, A is set for the VPN remote device ID, AC-1 is set for the VPN remote link IF ID. B is set for the remote device ID, BC-1 is set for the remote link IF ID. B is set for the VPN remote device ID. BC-1 is set for the VPN remote link IF ID. In the link IF ID=CD-1, D is set for the remote device ID. DC-1 is set for the remote link IF ID. VPN2-D is set for the VPN remote device ID. VPN2-DC-1 is set for the VPN remote link IF ID. In the link IF ID=CE-1, E is set for the remote device ID. EC-1 is set for the remote link IF ID. VPN1-E is set for the VPN remote device ID. VPN1-EC-1 is set for the VPN remote link IF ID.

(Step S15) After that, the all of the link information is transmitted to all of the remote devices which are contained in the neighbor link information DB 410 by the link information exchanging section 404. Simultaneously, all of the link information is received from the remote device. In such a case, if the remote device is contained in the CE DB 411 (step S51, S52), the filtering section 407 and the address converting section 408 are used for transmitting information (S 53, S55), and the VPN ID adding section 405 is used for receiving the information (step S54, S56). After the information is modified, a transmitting operation/receiving operation are performed (step S55, S56).

For example, in FIG. 12, the above data which relates to all of the link for the A-C, B-C, C-D, C-E, D-F, E-F, F-G, and F-H are transmitted and received.

Also, information are transmitted to the customer a as follows.

The device IDs are as follows such as VPN2-C, the link IF ID VPN2-CA-1, the remote device ID VPN2-A, the remote link IF ID VPN2-AC-1, the link IF ID VPN2-CD-1, the remote device ID VPN2-D, and the remote link IF ID VPN2-DC-1.

(Step S16) After that, if the path setting request is issued from the customer, a processing operation is performed in the path setting section 409. If a path is set successfully, the neighbor link information DB 410 is updated. The updated link information is transmitted to the remote device by the link information exchanging section 404.

For example, if the path setting request is performed under condition that the transmitting customer edge device ID=A from the customer edge device A, the beneficiary customer edge device ID=G, a route which should be passed by= (VPN2-C, VPN2-D, VPN2-F), and the bandwidth=10 M, the path setting request reaches to the device G via the devices C, D, F. Simultaneously, the information which contains a context such that the path setting request is successful is transmitted to the device A via F, D, C from the device G. The rest of the bandwidth of the link VPN2-AC-1 of the neighbor link information DB in the devices A, C is reduced by 10 M so as to be updated. The updated link information is transmitted by the link information exchanging section. It is the same as the link VPN2-CD-1, the VPN2-DF-1, and the VPN2-FG-1.

In the above embodiment, it is acceptable if the program for such a processing operation be contained in a recording medium such as a CD-ROM as an application software. By doing this, it is possible to contain a program, etc in a portable recording medium such as a CD-ROM, etc. so as to buy, sell, or carry therefore.

Figure 17:
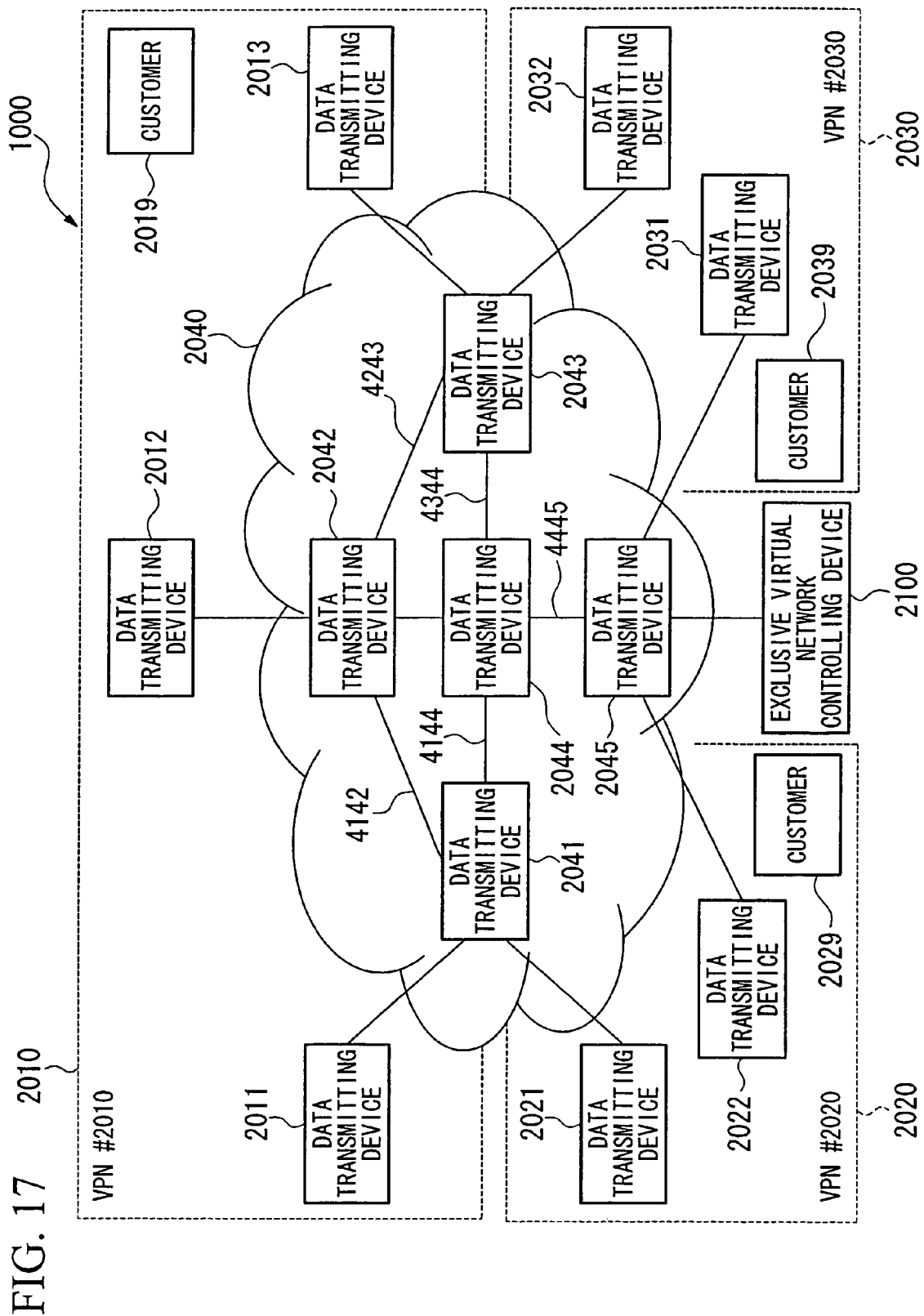
FIG. 17 is a view for a structure of a system for the virtual private network supplying system according to a third embodiment of the present invention.

Embodiments of the present invention are explained in detail with reference to drawings as follows. FIG. 17 is a view for a structure of a system for the virtual private network supplying system according to a third embodiment of the present invention. Hereinafter, the virtual private network is indicated as VPN.

As shown in FIG. 17, the VPN supplying system 1000 contains a virtual private network managing device 2100, a virtual network supplying networks 2040 for supplying the VPN, the VPN 2010, the VPN 2020, and the VPN 2030. For example, the VPN 2010, the VPN 2020, and the VPN 2030 are networks which can be supplied to an Internet service provider (ISP).

The virtual network supplying network 2040 contains the data transferring routes 2041 to 2045 and the links 4142, 4144, 4243, 4344, 4445. Here, the data transferring devices 2041 to 2045 are communication devices which contains a looter, a hub (HUB), an OXC (Optical Cross-Connect). The links 4142, 4144, 4243, 4344 and 4445 contain an optical fiber which connects a data transferring device and other data transferring device. In the present invention, it does not a matter whether they are performed in a cable communication method or a wireless communication method.

The VPN 2010 contains the virtual network supplying network 2040, the data transferring devices 2011 to 2013, and the customer device 2019. Here, the customer device 2019 manages the VPN. It is acceptable if the customer device 2019 be provided in the data transferring device in the VPN which is not contained in the virtual network supplying network 2040.

The VPN 2020 contains the virtual network supplying network 2040, the data transferring devices 2021 to 2022, and the customer device 2029. The VPN 2030 contains the virtual network supplying network 2040, the data transferring devices 2031 to 2032, and the customer device 2039.

Here, it is acceptable if each of the customer devices 2019, 2029, 2039 be connected to the data transferring devices 2011 to 2013, 2021, 2022, 2031, 2032 in the VPNs 2010, 2020, 2030 respectively. Also, it is acceptable if each of the customer devices 2019, 2029, 2039 be connected to a managing network for managing the VPN which is not shown in the drawing.

Figure 18:
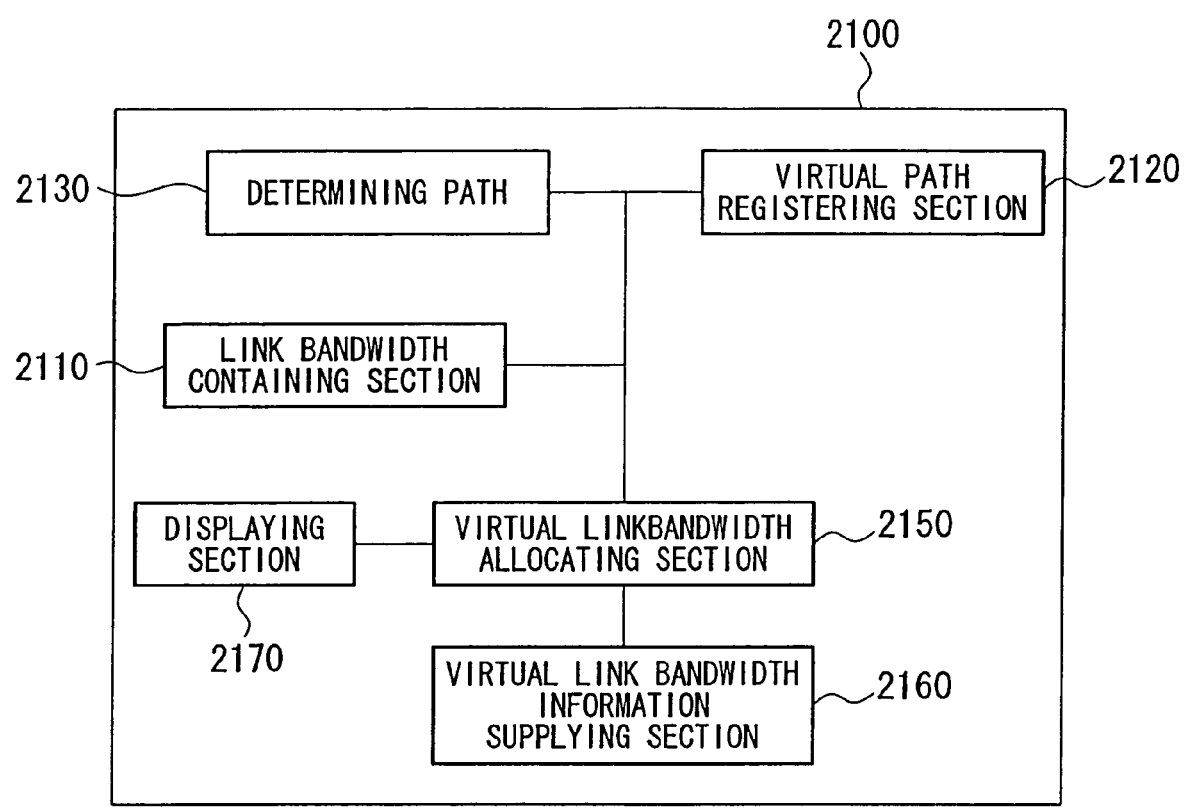
FIG. 18 is a block diagram of a virtual private network managing device according to the third embodiment of the present invention.

FIG. 2 is a block diagram of a virtual private network managing device according to the third embodiment of the present invention. As shown in FIG. 18, the virtual private network managing device 2100 contains a link bandwidth containing section 2110, the virtual route registering section 2120, the route determining section 2130, the virtual link bandwidth allocating section 2150, the virtual private network managing device 2160, and the displaying section 2170.

The link bandwidth containing section 2110 contains a link bandwidth information which indicates a link bandwidth for the links 4142, 4144, 4243, 4344, 4445 between the data transferring devices 2041 to 2045 in the virtual network supplying network 2040 which supplies the virtual private network. Here, an example for the link bandwidth information which is contained in the link bandwidth containing section 2110 is shown in a TABLE 1. Here, it is acceptable if link bandwidth containing section 2110 contain the link bandwidth information in a recording section which contains a hard disk which is provided in the virtual private network managing device 2100.

TABLE 1

| LINK BETWEEN THE DATA TRANSFERRING DEVICES | LINK BANDWIDTH |
|---|---|
| LINK 4142 | 100 |
| LINK 4243 | 100 |
| LINK 4144 | 100 |
| LINK 4344 | 100 |
| LINK 4445 | 200 |

As shown in the TABLE 1, for example, the link 4445 indicates that the link bandwidth is 200 Mbit/s. Here, 200 Mbit/s indicates that data amount such as 200 Mega bits can be used for 1 (one) second.

The virtual route registering section 2120 registers a virtual route which is formed by a predetermined data transferring route which relates to the virtual private network in the virtual network supplying network 2040 and the virtual link bandwidth. Here, the virtual route is formed a route which exists actually or a virtual route. For example, the information for the virtual route which relates to the virtual route and the virtual link bandwidth which is an upper limit for the bandwidth which corresponds to this virtual route are input in the virtual route registering section 2120 by a network manager who manages the virtual network supplying network according to a contract with an ISP, etc. which operates a VPN; thus, the virtual route registering section 2120 registers the input virtual route information.

Here, an example for the virtual route registering section which is registered by the virtual route registering section 2120 in TABLE 2. As shown in the TABLE 2, the virtual route of the VPN 2010 is formed by a link between the data transferring device 2041 and the data transferring device 2042 and a link between the data transferring device 2042 and the data transferring device 2043 such that each of the virtual link bandwidth is 10 Mbit/s. Also, the virtual route of the VPN 2020 is formed by a link between the data transferring device 2041 and the data transferring device 2045 such that the virtual link bandwidth is 10 Mbit.s. Here, the link between the data transferring device 2041 and the data transferring device 2045, and the link between the data transferring device 2043 and the data transferring device 2045 are formed by a virtual route which does not exist actually.

TABLE 2

| VPN | VIRTUAL ROUTE | VIRTUAL ROUTE (NAME) | VIRTUAL LINK BANDWIDTH |
|---|---|---|---|
| VPN10 | LINK BETWEEN DATA TRANSFERRING DEVICE 2041 AND DATA TRANSFERRING DEVICE 2042 | V2011 | 10 |
|  | LINK BETWEEN DATA TRANSFERRING DEVICE 2042 AND DATA TRANSFERRING DEVICE 2043 | V2012 | 10 |
| VPN20 | LINK BETWEEN DATA TRANSFERRING DEVICE 2041 AND DATA TRANSFERRING DEVICE 2045 | V2021 | 10 |
| VPN30 | LINK BETWEEN DATA TRANSFERRING DEVICE 2043 AND DATA TRANSFERRING DEVICE 2042 | V2032 | 10 |

Here, it is described as follows.
The virtual route which indicates the link between the data transferring device 2041 and the data transferring device 2042 is indicated as a virtual route V2011.
The virtual route which indicates the link between the data transferring device 2042 and the data transferring device 2043 is indicated as a virtual route V2012.
The virtual route which indicates the link between the data transferring device 2041 and the data transferring device 2045 is indicated as a virtual route V2021.
The virtual route which indicates the link between the data transferring device 2043 and the data transferring device 2045 is indicated as a virtual route V2031.

The route determining section 2130 selects a virtual route which is registered by the virtual route registering section 2120 one by one, determines a corresponding route which is formed by a data transferring route which corresponds to the selected virtual route, and outputs an information which relates to the determined corresponding route to the virtual link bandwidth allocating section 2150.

Here, an example for a corresponding route which is determined by the route determining section 2130 is shown in TABLE 3.

TABLE 3

| VPN | VIRTUAL ROUTE | CORRESPONDING ROUTE |
|---|---|---|
| VPN10 | V2011 | LINK 4142 |
|  | V2012 | LINK 4243 |
| VPN20 | V2021 | LINK 4144 AND LINK 4445 |
| VPN20 | V2032 | LINK 4344 AND LINK 4445 |

For example, the route determining section 2130 selects the virtual route one by one, calculates the shortest data transferring route which corresponds to the data transferring device in an end of the selected virtual route and the another data transferring device by a commonly know CSPF (Constraint Shortest Path First), etc. so as to determine the calculated data transferring route for the corresponding route.

In the present embodiment, the route determining section 2130 determines the link 4144 and the link 4445 which are the shortest data transferring routes for the corresponding routes when the virtual route of the VPN 2020 such as the virtual route V2021 is selected.

When the corresponding route information which is output from the route determining section 2130 into the virtual link bandwidth allocating section 2150, the virtual link bandwidth allocating section 2150 obtains a virtual link bandwidth from the virtual route registering section 2120, allocates the obtained virtual link bandwidth to the corresponding route so as to output the virtual link band width information which relates to the allocated virtual link bandwidth to the virtual link band width information supplying function 2160. Also, it is acceptable if the virtual link bandwidth allocating section 2150 output the virtual link bandwidth information to the displaying section 2170.

Here, an example for the virtual link bandwidth information which relates to the virtual link bandwidth which is allocated by the virtual link bandwidth allocating section 2150 in a TABLE 4.

TABLE 4

| VIRTUAL ROUTE | CORRESPONDING ROUTE | VIRTUAL LINK BANDWIDTH |
|---|---|---|
| V2011 | LINK 4142 | 10 |
| V2012 | LINK 4243 | 10 |
| V2021 | LINK 4144 AND LINK 4445 | 10 |
| V2032 | LINK 4344 AND LINK 4445 | 10 |

For example, the virtual link bandwidth allocating section 2150 allocates 10 Mbit/s for the virtual link bandwidth which corresponds to the virtual route information which is shown in the TABLE 2 to the link 4144 and the link 4445 for the virtual route V2021.

Here, if a total of the virtual link bandwidth for the link which is included in the corresponding route exceeds the bandwidth which is shown in the TABLE 1, it is acceptable that the virtual link bandwidth allocating section 2150 notify such an abnormality to the network manager.

The virtual link bandwidth information which is output from the virtual link bandwidth allocating section 2150 is input to the virtual link band width information supplying function 2160. The virtual link band width information supplying function 2160 supplies the input virtual link bandwidth information to the customer devices 2019, 2029, 2039. For example, it is acceptable if the virtual link band width information supplying function 2160 contains the virtual link bandwidth information in a WEB server, etc., and the customer devices 2019, 2029, 2039 download the contained virtual link bandwidth information via the virtual network supplying network 2040 or a managing network.

An example for an image in which the virtual link band width information supplying function 2160 supply the virtual link bandwidth information to the customer device 2019 which manages the VPN 2010 is shown in FIG. 19A1. An example for an image in which the virtual link band width information supplying function 2160 supply the virtual link bandwidth information to the customer device 2029 which manages the VPN 2020 is shown in FIG. 19B1. An example for an image in which the virtual link band width information supplying function 2160 supply the virtual link bandwidth information to the customer device 2039 which manages the VPN 2030 is shown in FIG. 19C1.

For example, as shown in FIG. 19B1, it is shown that the virtual link bandwidth is 10 Mbit/s in the virtual route V2010. Also, it is acceptable if the virtual link band width information supplying function 2160 supplies the link bandwidth information between the data transferring device 41 which includes the virtual network supplying network 40 and the data transferring device 21 which does not include the virtual network supplying network 2040.

The virtual link bandwidth information which is output from the virtual link bandwidth allocating section 2150 is input into the displaying section 2170. The displaying section 2170 displays the input virtual link bandwidth information on its display monitor. An example for an image in which the displaying section 2170 displays the virtual link bandwidth information which relates to the VPN 10 is shown in FIG. 19A1. An example for an image in which the displaying section 2170 displays the virtual link bandwidth information which relates to the VPN 2020 is shown in FIG. 19B1. An example for an image in which the displaying section 2170 displays the virtual link bandwidth information which relates to the VPN 2030 is shown in FIG. 19C1.

An example for an image in which the displaying section 2170 displays the virtual link bandwidth information which relates to the VPN 10 is shown in FIG. 19A2. An example for an image in which the displaying section 2170 displays the virtual link bandwidth information which relates to the VPN 2020 is shown in FIG. 19B2. An example for an image in which the displaying section 2170 displays the virtual link bandwidth information which relates to the VPN 2030 is shown in FIG. 19C2. For example, as shown in FIG. 19B2, the link between the data transferring device 2041 and the data transferring device 2044 indicates that the virtual link bandwidth is 10 Mbit/s and the virtual link bandwidth is 10 Mbit/s between the data transferring device 2044 and the data transferring device 2045.

Figure 20:
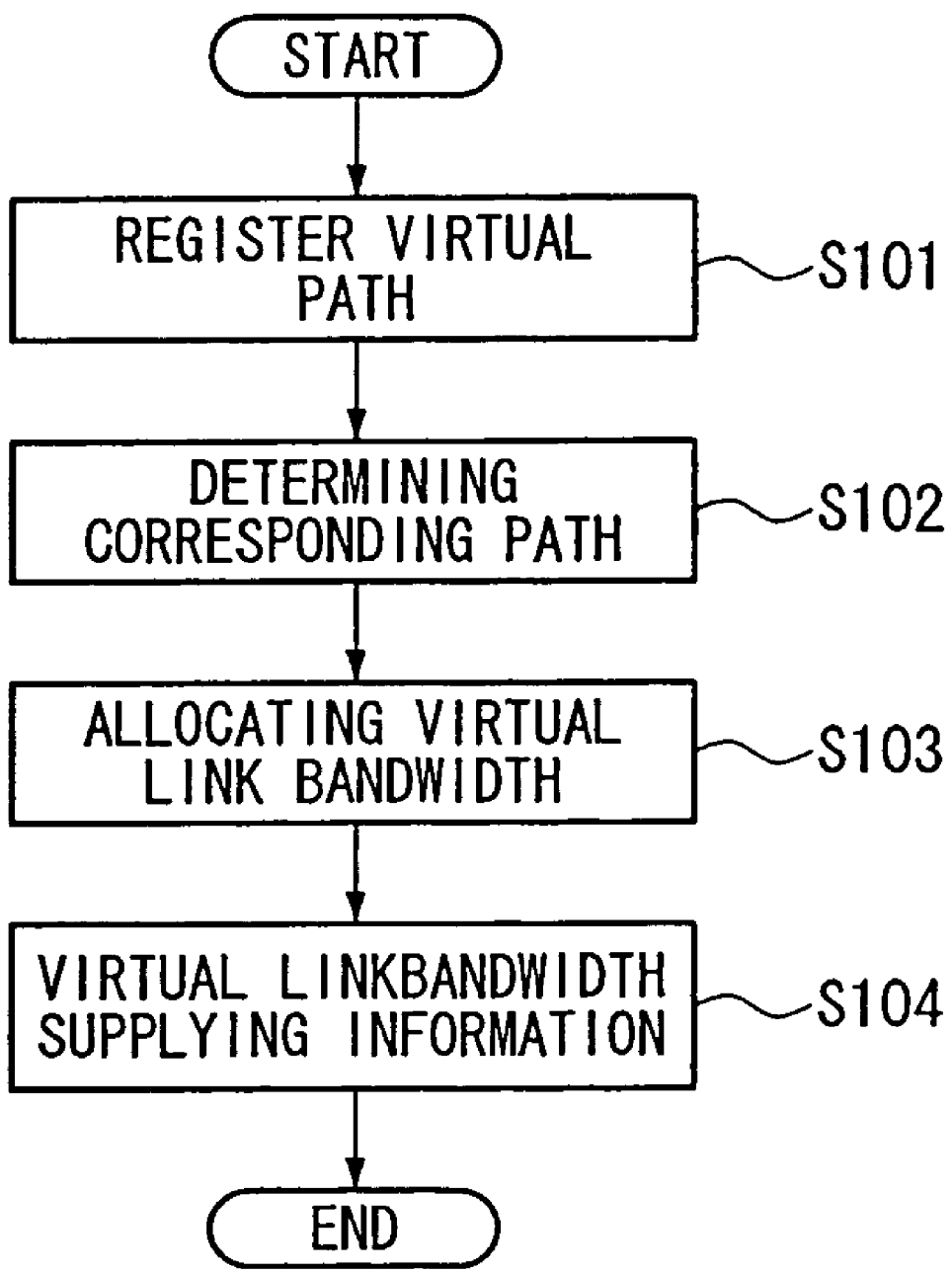
FIG. 20 is a flow chart for processes in the virtual private network managing device according to the third embodiment of the present invention.

Processes in the virtual private network managing device according to a third embodiment t of the present invention are explained with reference to drawinigs. FIG. 20 is a flow chart for processes in the virtual private network managing device according to the third embodiment of the present invention. First, The virtual route registering section 2120 registers a virtual route which is formed by a predetermined data transferring route which relates to the virtual private network 2040 in the virtual network supplying network 2040 and the virtual link bandwidth (Step S101). Next, the corresponding route which is formed by the data transferring route which corresponds to the virtual route which is registered by the virtual route registering section 2120 is determined by the route determining section 2130 (Step S102). The virtual link bandwidth which corresponds to the corresponding route is allocated by the virtual link bandwidth allocating section 2150 (Step S103). The virtual link bandwidth information which relates to the allocated virtual link bandwidth is supplied each of the customer devices 2019, 2029, 2039 by the virtual link band width information supplying function 2160.

As explained above, the virtual private network managing device 2100 and the virtual private network supplying system 1000 according to the third embodiment of the present invention can supply information which indicates the accurate virtual link bandwidth to the customer devices 2019, 2029, 2039 with regardless to the data transferring route in the VPNs 2010, 2020, 2030 in the virtual network supplying network 2040 in order to register the predetermined corresponding route which relates to the virtual private network and allocate the virtual link bandwidth to the corresponding route which corresponds to the registered virtual route. Also, because the information which relates to the virtual link bandwidth is displayed on its display, it is possible that the network manager, etc. can check the information which relates to the virtual link bandwidth which is supplied to the customer devices 2019, 2029, 2039.

Figure 21:
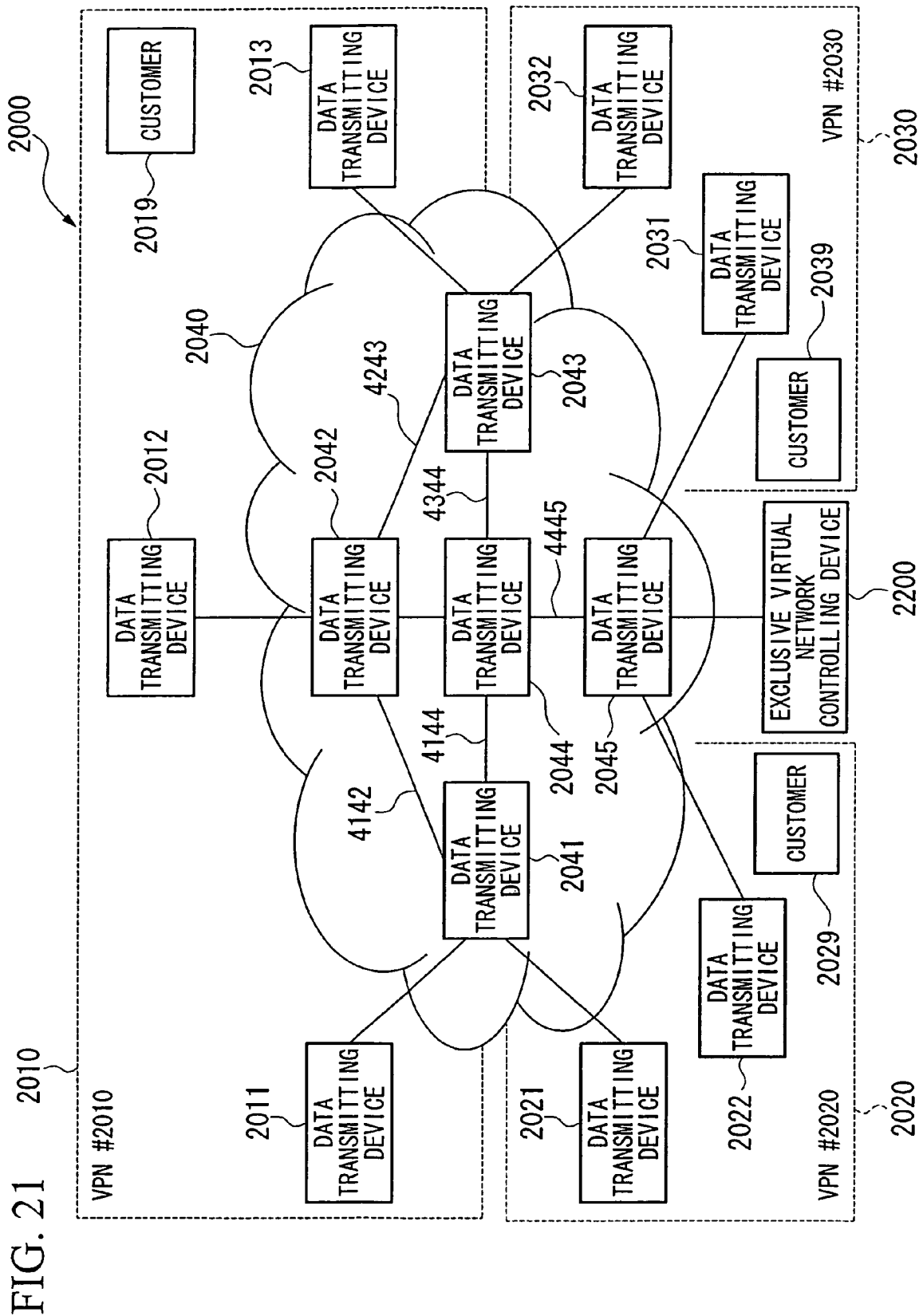
FIG. 21 is a view for a structure of a system for the virtual private network supplying system according to a fourth embodiment of the present invention.

FIG. 21 is a view for a structure of a system for the virtual private network supplying system according to a fourth embodiment of the present invention. Hereinafter, the virtual private network is indicated by VPN.

As shown in FIG. 20, the VPN supplying system 2000 contains a virtual private network managing device 2200, a virtual network supplying networks 2040 for supplying the VPN, the VPN 2010, the VPN 2020, and the VPN 2030. For example, the VPN 2010, the VPN 2020, and the VPN 2030 are networks which can be supplied to an Internet service provider. Here, same reference numerals for the elements which form the VPN supplying system 2000 according to a fourth embodiment of the present invention are add to elements which forms the VPN supplying system 1000 which relates to the third embodiment of the present invention shown in FIG. 17; thus, duplicated explanations are omitted.

Figure 22:
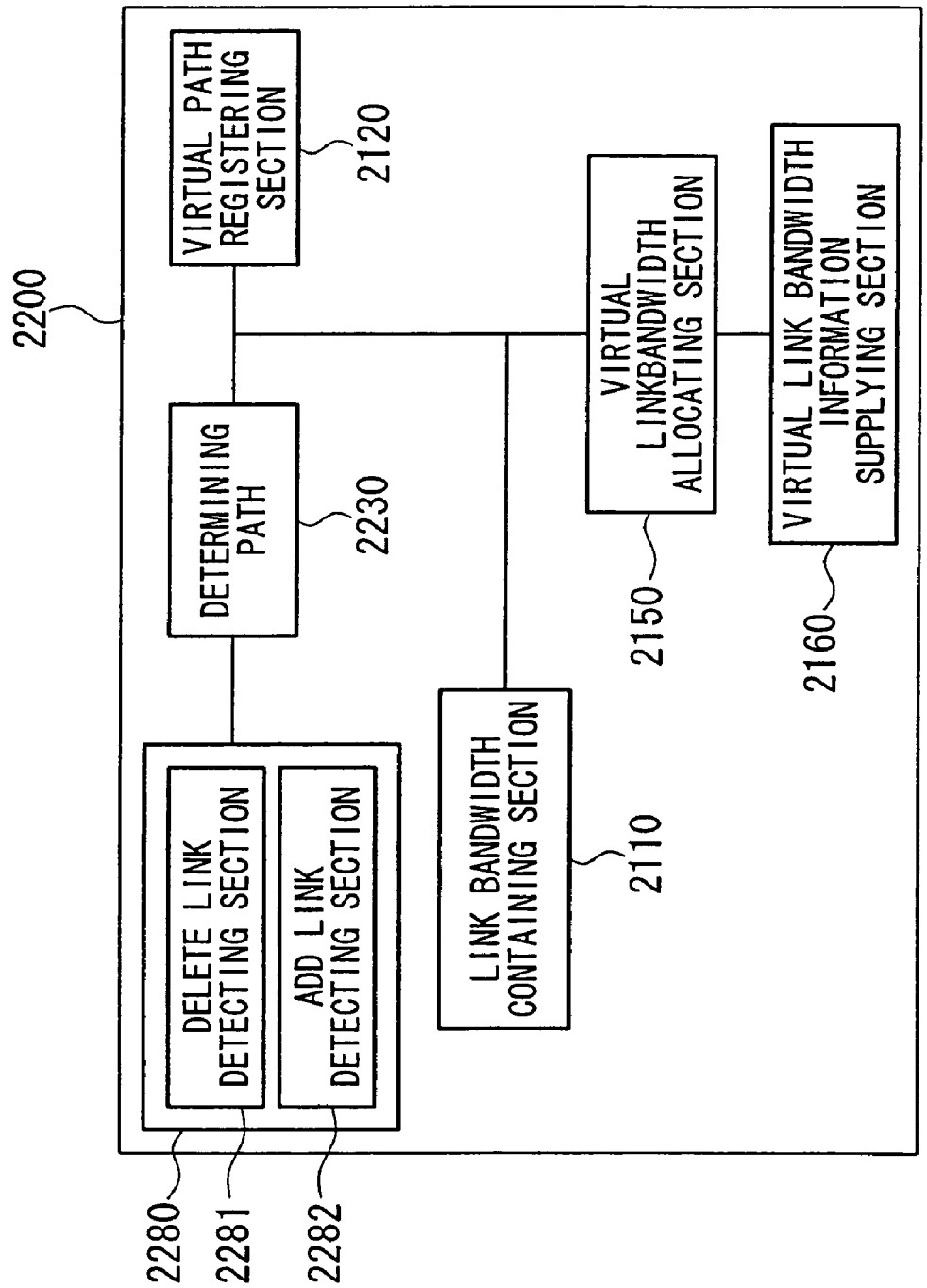
FIG. 22 is a block diagram of a virtual private network managing device according to the fourth embodiment of the present invention.

FIG. 22 is a block diagram of a virtual private network managing device according to the fourth embodiment of the present invention. As shown in FIG. 22, the virtual private network managing device 2200 contains a link bandwidth containing section 2110, the virtual route registering section 2120, the route determining section 2230, the virtual link bandwidth allocating section 2150, the virtual private network managing device 2160, and the route change detecting section 2280. Here, same reference numerals for the elements which form the VPN supplying system 2200 according to a fourth embodiment of the present invention are add to elements which forms the VPN supplying system 2100 which relates to the third embodiment of the present invention shown in FIG. 18; thus, duplicated explanations are omitted.

Here, the link bandwidth containing section 2110 contains the link bandwidth information which is shown in the TABLE 1. Also, as shown in the TABLE 2, the virtual route registering section 2120 registers the virtual route which corresponds to each of the VPNs 2010, 2020, 2030 and the virtual link bandwidth.

The route change detecting section 2280 contains the link deletion detecting section 2281 and the link addition detecting section 2282 so as to detect a route change of the data transferring route in the virtual network supplying network 2040.

The link deletion detecting section 2281 detects a route change in the data transferring route in the virtual network supplying network 2040 so as to output the information for the route change which relates to the detected route change to the route determining section 2230 according to deletion for the links 4142,4144, 4243, 4344, 4445 among the data transferring devices 2041 to 2045 in the virtual network supplying network 2040. For example, when the link 4144 is deleted, the link deletion detecting section 2281 detects the route change for the data transferring route in the virtual network supplying network 2040 according to the deletion of the link 4144.

The link addition detecting section 2282 detects a route change in the data transferring route in the virtual network supplying network 2040 so as to output the information for the route change which relates to the detected route change to the route determining section 2230 according to the addition of the links among the data transferring devices 2041 to 2045 in the virtual network supplying network 2040. For example, as explained above, when the deleted link 4144 is added again, the link addition detecting section 2282 detects the route change of the data transferring route in the virtual network supplying network 2040 according to the addition of the link 4144.

The information for the route change which is output from the route change detecting section 2280 is input to the route determining section 2230. The route determining section 2230 determines the corresponding route which corresponds to the virtual route which is registered by the virtual route registering section 2120 according to the input route change detecting section. Thus, the information for the corresponding route which relates to the determined corresponding route is output to the virtual link bandwidth allocating section 2150.

For example, the route determining section 2230 make a decision by changing the corresponding route which is shown in the TABLE 5 from the corresponding route which is shown in the TABLE 3 according to the shortest data transferring route in the virtual network supplying network 2040 which corresponds to the virtual route. The corresponding route which corresponds to the virtual route V2020 of the VPN 2020 is formed by the links 4142, 4243, 4445.

TABLE 5

| VPN | VIRTUAL ROUTE | CORRESPONDING ROUTE |
| --- | --- | --- |
| VPN10 | V2011 | LINK 4142 |
|  | V2011 | LINK 4243 |
| VPN20 | V2021 | LINK 4144, LINK 4142, LINK 4344 AND LINK 4445 |
| VPN30 | V2032 | LINK 4344 AND LINK 4445 |

Also, when the link 4144 is added, the route determining section 2230 make a decision by changing the corresponding route which is shown in the TABLE 3 from the corresponding route which is shown in the TABLE 5 according to the shortest data transferring route in the virtual network supplying network 2040 which corresponds to the virtual route.

Figure 23A:
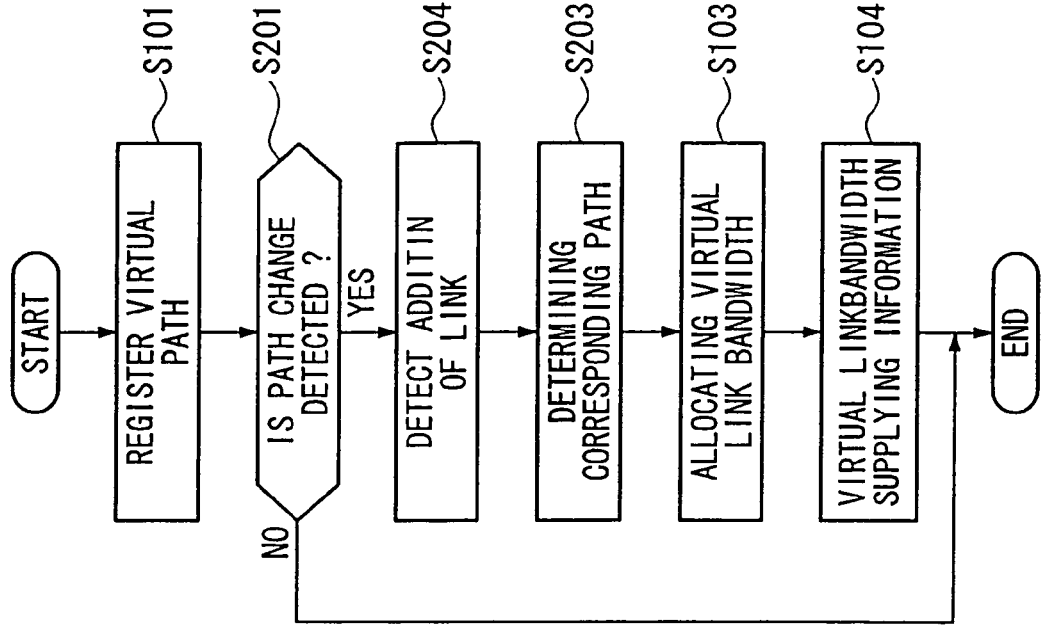
FIGS. 23A to 23B are flow charts for processes in the virtual private network managing device according to the fourth embodiment of the present invention.

Processes in the virtual private network managing device according to a fourth embodiment t of the present invention are explained with reference to drawings. FIGS. 23A and 24B are flow charts for processes in the virtual private network managing device according to the fourth embodiment of the present invention. Here, same reference numerals for the processes which form the VPN supplying system 2200 according to a fourth embodiment of the present invention are add to processes which forms the VPN supplying system 2100 which relates to the third embodiment of the present invention shown in FIG. 20; thus, duplicated explanations are omitted. Hereinafter, processes in the virtual private network managing device according to a second embodiment of the present invention is explained separately for case a case in which the link is deleted and for a case in which the link is added.

As shown in FIG. 23A, the route change of the data transferring route in the virtual network supplying network 2040 is detected by the x route change detecting section 2280 according to the deletion for the links 4142, 4144, 4243, 4445 among the data transferring devices 2041 to 2045 in the virtual network supplying network 2040, the process forwards to the step S203 from the step S202. If the route change is not detected, the process is completed (Step S201). For example, the link 4144 which corresponds to the VPN 2020 is deleted, the route change is detected by the link deletion detecting section 2281 (Step S202).

The corresponding route which corresponds to the virtual route which is registered by the virtual route registering section 2120 according to the information for the route change is determined by the route determining section 2230. For example, the link 4144 which corresponds to the VPN 2020 is deleted, the corresponding route which is shown in the TABLE 3 is changed to the corresponding route which is shown in the TABLE 5 so as to be determined.

The virtual link bandwidth which corresponds to the corresponding route is allocated by the virtual link bandwidth allocating section 2150 (Step S103). The virtual link bandwidth information which relates to the allocated virtual link bandwidth is supplied to each of the customer devices 2019, 2029, 2039 by the virtual link band width information supplying function 2160 (Step S104). Here, an example for an image in which the virtual link band width information supplying function 2160 supply the virtual link bandwidth information to the customer device 2029 which manages the VPN 2020 is shown in FIG. 19B1.

Figure 23B:
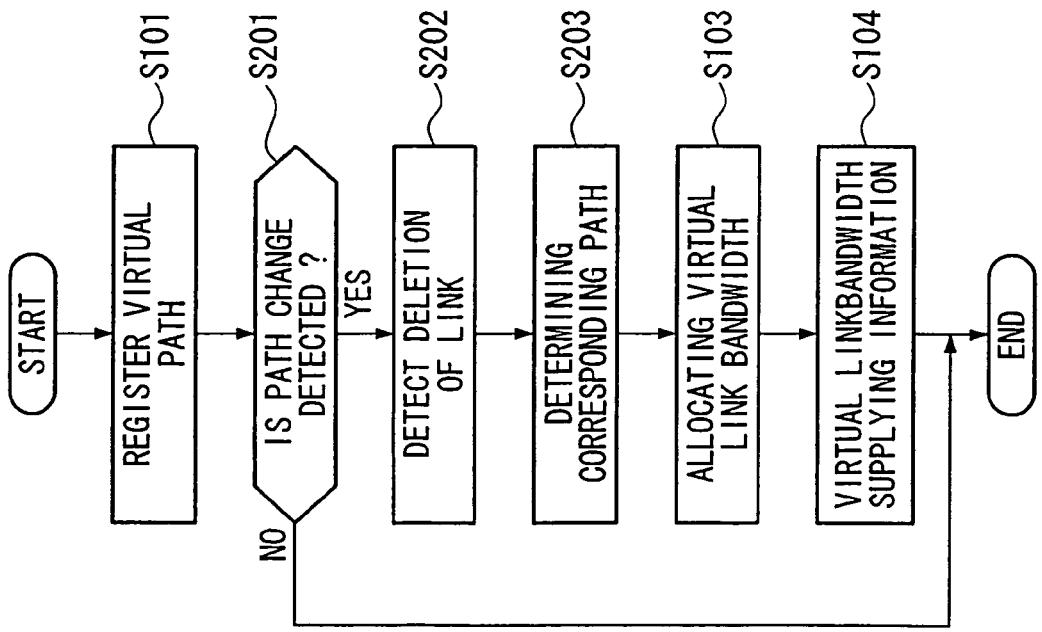

As shown in FIG. 23B, for example, when the link 4144 which corresponds to the VPN 2020 is added, the route change is detected by the link deletion detecting section 282 (Step S204). The corresponding route which corresponds to the virtual route which is registered by the virtual route registering section 2120 according to the information for the route change is determined by the route determining section 2230 (Step S203). For example, when the link 4144 which corresponds to the VPN 2020 is added, the corresponding route which is shown in the TABLE 5 is changed to the corresponding route which is shown in the TABLE 3 so as to be determined. Here, an example for an image in which the virtual link band width information supplying function 2160 supply the virtual link bandwidth information to the customer device 2029 which manages the VPN 2020 is shown in FIG. 19B1.

As explained above, the virtual private network managing device 2200 and the virtual private network managing system 2000 according to the fourth embodiment of the present invention can supply the information which can indicate accurate virtual link bandwidth to the customer devices 2019, 2029, 2039 even if the path is changed during an operation of the virtual private network so as to detect the route change of the data transferring route in the virtual network supplying network 2040. Also, it is possible to supply the information which indicates an accurate link bandwidth to the customer devices 2019, 2029, 2039 for detecting the changed path in the data transferring route in the virtual network supplying network 2040 according to the deletion of the links 4142, 4144, 4243, 4344, 4445 even if a path is changed during the operation of the virtual private network. Also, because the route change for the data transferring route in the virtual private network 2004 is detected according to the addition of the links, even if a path is changed during the operation of the virtual private network, it is possible to supply the information which indicates an accurate link bandwidth to the customer devices 2019, 2029, 2039.

Figure 24:
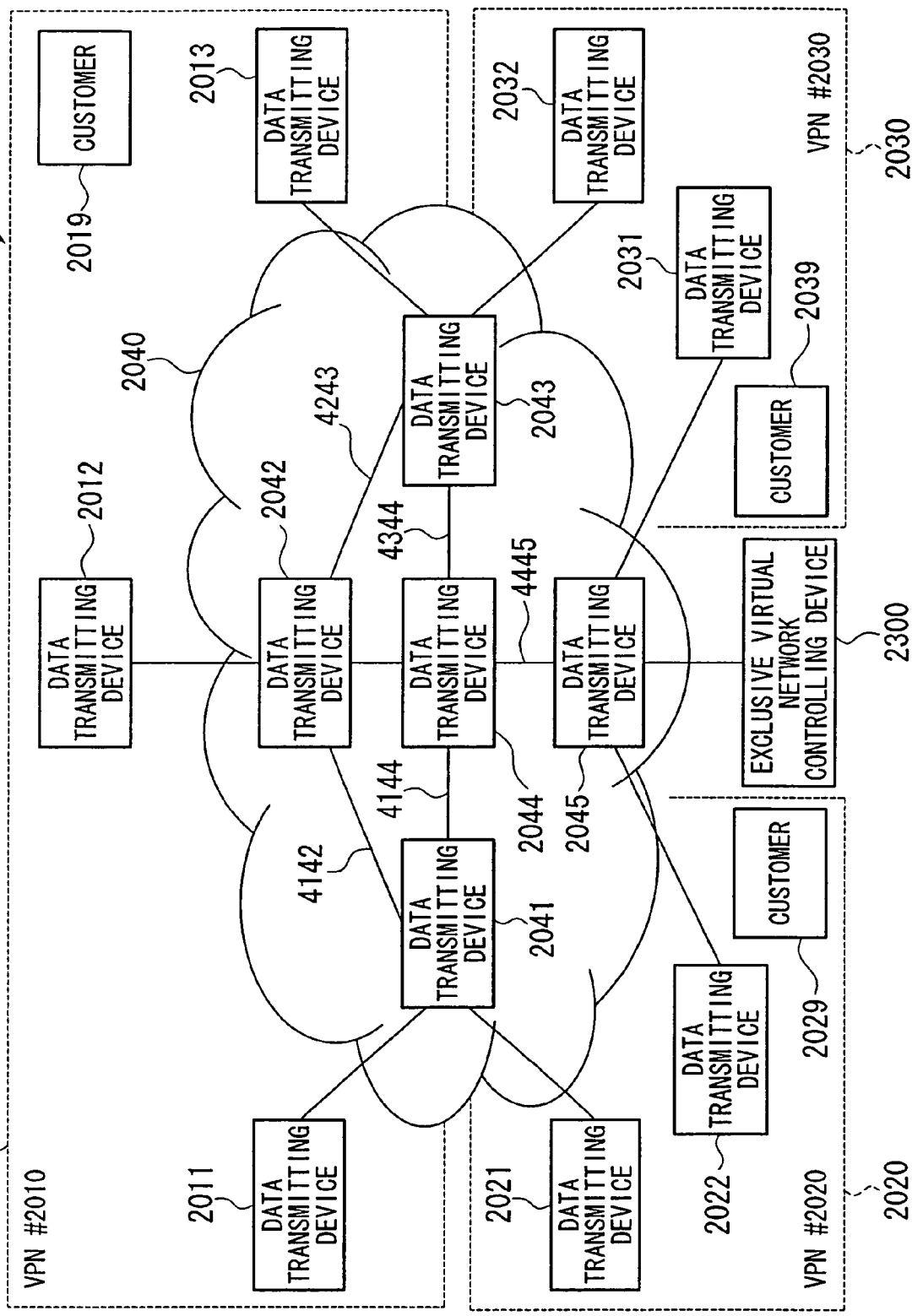
FIG. 24 is a view for a structure of a system for the virtual private network supplying system according to a fifth embodiment of the present invention.

FIG. 24 is a view for a structure of a system for the virtual private network supplying system according to a fifth embodiment of the present invention. Hereinafter, the virtual private network is represented by VPN.

As shown in FIG. 24, the VPN supplying system 3000 contains a virtual private network managing device 2300, a virtual network supplying networks 2040 for supplying the VPN, the VPN 2010, the VPN 2020, and the VPN 2030. For example, the VPN 2010, the VPN 2020, and the VPN 2030 are networks which can be supplied to an Internet service provider. Here, same reference numerals for the elements which form the VPN supplying system 3000 according to a fifth embodiment of the present invention are add to elements which forms the VPN supplying system 1000 which relates to the third embodiment of the present invention shown in FIG. 17; thus, duplicated explanations are omitted.

Figure 25:
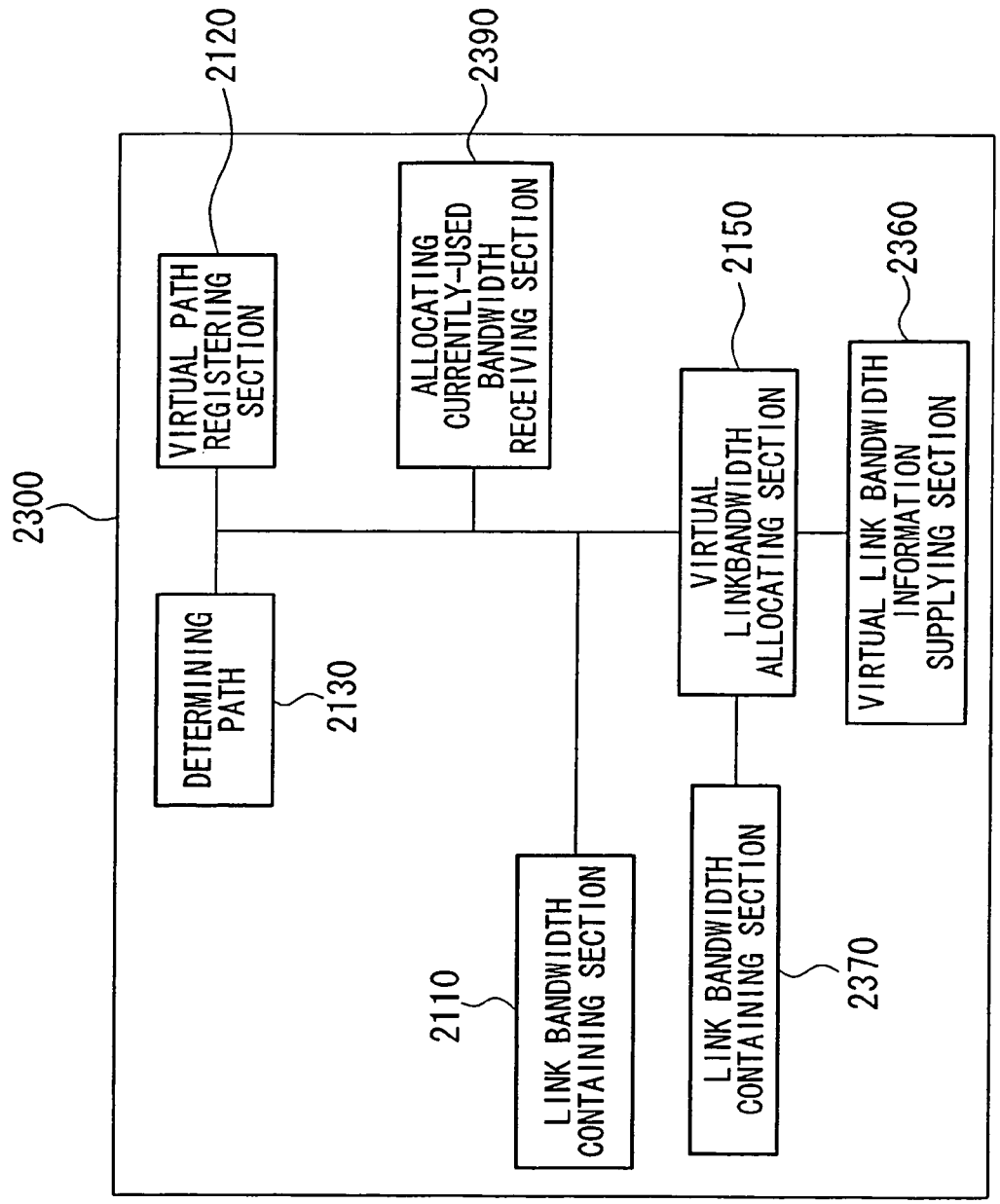
FIG. 25 is a block diagram of a virtual private network managing device according to the fifth embodiment of the present invention.

FIG. 25 is a block diagram of a virtual private network managing device according to the fifth embodiment of the present invention. As shown in FIG. 25, the virtual private network managing device 2300 contains a link bandwidth containing section 2110, the virtual route registering section 2120, the route determining section 2130, the virtual link bandwidth allocating section 2350, the virtual private network managing device 2360, the displaying section 2370, and the currently using bandwidth information receiving section 2390. Here, same reference numerals for the elements which form the VPN supplying system 2300 according to a fifth embodiment of the present invention are add to elements which forms the VPN supplying system 2100 which relates to the third embodiment of the present invention shown in FIG. 18; thus, duplicated explanations are omitted.

currently-used bandwidth information receiving section 2390 receives the currently-used bandwidth information for establishing a connection so as to output the received currently-used bandwidth information to the virtual link bandwidth allocating section 2350.

Here, the currently-used bandwidth information contains a bandwidth which is used for establishing the connection and the virtual route which the connection passes by. Also, it is acceptable if the currently-used bandwidth information receiving section 2390 receive the currently-used bandwidth information from the customer devices 2019, 2029, 2039. Also, it is acceptable if the currently using bandwidth information receiving section 2390 receive the currently-used bandwidth information from the data transferring devices 2011 to 2013, 2021, 2022, 2031, 2032.

The information for the corresponding route which is output from the route determining section 2130 is input to the virtual link bandwidth allocating section 2350. The virtual link bandwidth allocating section 2350 obtains the virtual link bandwidth from the virtual route registering section 2120 so as to allocate the obtained virtual link to the corresponding route. Also, the currently-used bandwidth information which is output from the currently using bandwidth information receiving section 2390 is input to the virtual link bandwidth allocating section 2350. The virtual link bandwidth allocating section 2350 extracts the virtual route which is contained in the currently-used bandwidth information. The corresponding route which is output from the route determining section 2130 is extracted from the virtual route. Thus, the currently-used bandwidth which is contained in the currently-used bandwidth information is allocated to the corresponding route. Also, it is acceptable that whether or not the currently-used bandwidth exceeds the virtual link bandwidth is determined such that the possibility for the connection may be refused when the currently-used bandwidth exceeds the virtual link bandwidth.

For example, if a connection is established which passes by the link 4142 and the link 4243 so as to use 2 Mbit/s, the virtual link bandwidth allocating section 2350 allocates 2 Mbps/s to the VPN 10. Also, if a connection is established which passes by the link 4144 and the link 4445 so as to use 3 Mbit/s, the virtual link bandwidth allocating section 2350 allocates 3 Mbps/s to the VPN 2020. Here, an example for the virtual link bandwidth information and the currently-used bandwidth information which are allocated by the virtual link bandwidth allocating section 2350 is shown in a TABLE 6.

TABLE 6

| VIRTUAL ROUTE | CORRESPONDING ROUTE | VIRTUAL LINK BANDWIDTH | CURRENTLY-USED BANDWIDTH |
|---|---|---|---|
| V2011 | LINK 4142 | 10 | 2 |
| V2012 | LINK 4243 | 10 | 2 |
| V2021 | LINK 4144 AND LINK 4445 | 10 | 3 |
| V2031 | LINK 4344 AND LINK 4445 | 10 | 1 |

The virtual link bandwidth information which is output from the virtual link bandwidth allocating section 2360 and the currently-used bandwidth information are input to the virtual link band width information supplying function 2360. The virtual link band width information supplying function 2360 supplies the input virtual link bandwidth information and the currently-used bandwidth information to the customer devices 2019, 2029, 2039.

An example for an image in which the virtual link band width information supplying function 2360 supplies the virtual link bandwidth information and the information for the rest of the bandwidth to the customer device 2019 which manages the VPN 2010 is shown in FIG. 26A1. Here, the information for the rest of the bandwidth indicates a bandwidth which is calculated by reducing the currently-used bandwidth information from the virtual link bandwidth. An example for an image in which the virtual link bandwidth information and the information for the rest of the bandwidth are supplied to the customer device 2029 which manages the VPN 2020 is shown in FIG. 26B1. An example for an image in which the virtual link bandwidth information and the information for the rest of the bandwidth are supplied to the customer device 2039 which manages the VPN 2030 is shown in FIG. 26C1. Here, values in parenthesis indicates the virtual link bandwidth. For example, as shown in FIG. 26B1, it is shown that the virtual link bandwidth is 10 Mbit/s and the virtual link bandwidth is 7 Mbit/s in the virtual route V2021.

The virtual link bandwidth information which is output from the virtual link bandwidth allocating section 2350 and the currently-used bandwidth information are input into the displaying section 2370. The displaying section 2370 displays the input virtual link bandwidth information and the currently-used bandwidth information on its display monitor.

An example for an image in which the displaying section 2370 displays the virtual link bandwidth information and theh information for the rest of the bandwidth which relate to the VPN 10 is shown in FIG. 26A1. An example for an image in which the displaying section 2020 displays the virtual link bandwidth information and the information for the rest of the bandwidth which relate to the VPN 10 is shown in FIG. 26B1. An example for an image in which the displaying section displays the virtual link bandwidth information and the information for the rest of the bandwidth which relate to the VPN 30 is shown in FIG. 26C1.

Also, it is acceptable if the displaying section 2370 display the virtual link bandwidth information and the information for the rest of the bandwidth which relate to the corresponding route on its display monitor. An example for an image in which the virtual link bandwidth information of the corresponding route and the information for the rest of the bandwidth which relate to the VPN 2010 is shown in FIG. 26A2. An example for an image in which the virtual link bandwidth information of the corresponding route and the information for the rest of the bandwidth which relate to the VPN 2020 is shown in FIG. 26B2. An example for an image in which the virtual link bandwidth information and the information for the rest of the bandwidth of the corresponding route which relate to the VPN 2030 is shown in FIG. 26C2.

For example, as shown in FIG. 26B2, the link between the data transferring device 2041 and the data transferring device 2044 indicates that the virtual link bandwidth is 10 Mbit/s and the rest of the bandwidth is 7 Mbit/s. Also, the link between the data transferring device 2044 and the data transferring device 2045 indicates that the virtual link bandwidth is 10 Mbit/s and the rest of the bandwidth is 7 Mbit/s.

Figure 27:
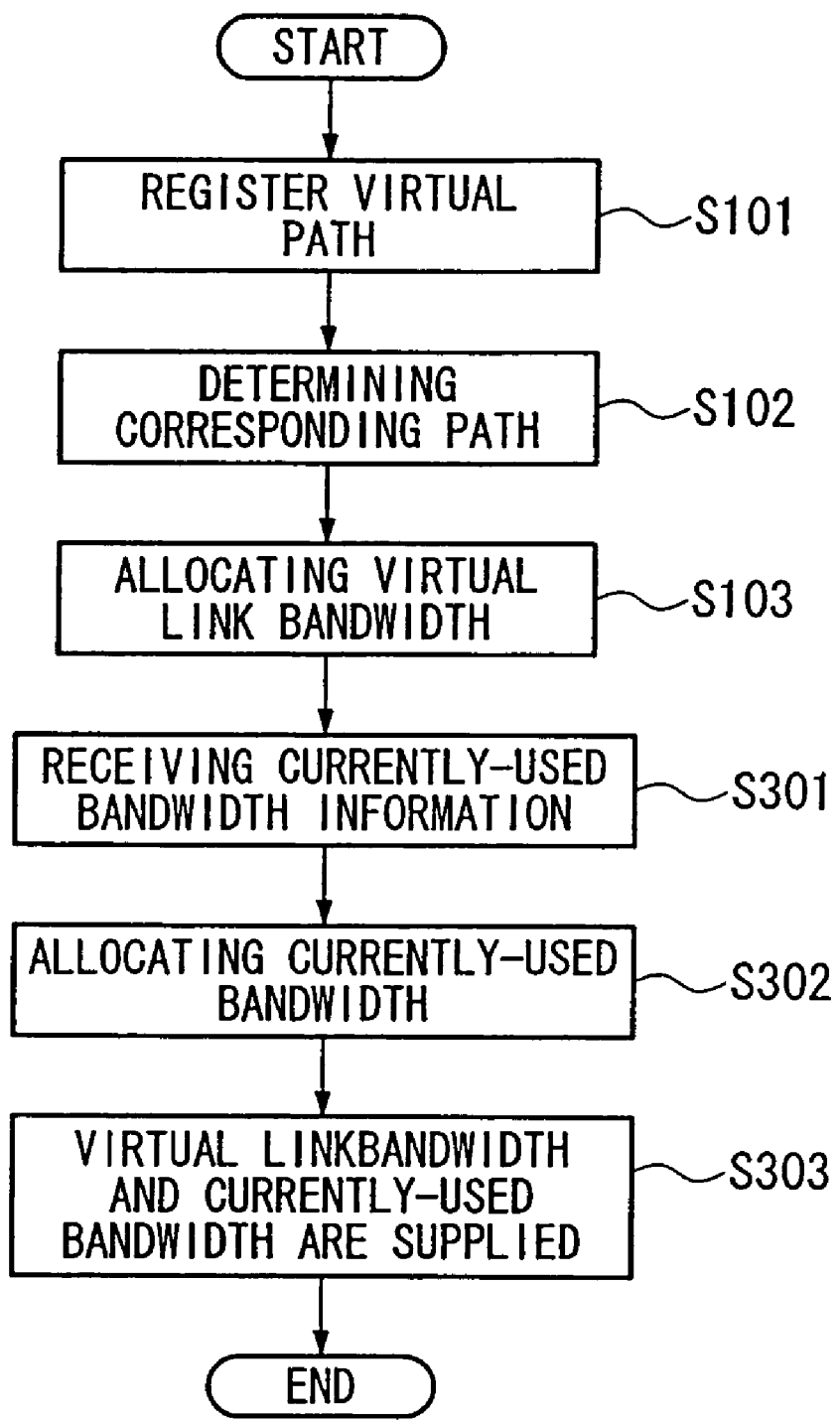
FIG. 27 is a flow chart for processes in the virtual private network managing device according to the fifth embodiment of the present invention.

Processes in the virtual private network managing device according to a fifth embodiment t of the present invention are explained with reference to drawings. FIG. 27 is a flow chart for processes in the virtual private network managing device according to the fifth embodiment of the present invention. Here, same reference numerals for the processes which form the VPN supplying system 2300 according to a fifth embodiment of the present invention are add to processes which forms the VPN supplying system 2100 which relates to the third embodiment of the present invention shown in FIG. 20; thus, duplicated explanations are omitted. Also, explanation is made under condition that the processes from the step 101 to the step 103 are completed.

First, the currently-used bandwidth information which is transmitted from the customer devices 2019, 2029, 2039 etc. for establishing the connection is received by the currently-used bandwidth information receiving section 2390 (Step S301). The used bandwidth is allocated to the corresponding route together with the virtual link bandwidth by the virtual link bandwidth allocating section 2350 (Step S302).

Next, the allocated virtual link bandwidth information and the currently-used bandwidth information are supplied to each of the customer devices 2019, 2029, 2039 in images which are shown in FIGS. 26A1, 26B1, 26C1 by the virtual link band width information supplying function 2360 (Step S303).

As explained above, the virtual private network managing device 2300 and the virtual private network supplying system 3000 according to the fifth embodiment of the present invention supply the virtual link bandwidth information and the currently-used bandwidth information to the customer devices 2019, 2029, 2039; therefore, it is possible to establish the connection reliably while acknowledging the used bandwidth in the customer devices 2019, 2029, 2039.

Also, the link bandwidth containing section 2110, the virtual route registering section 2120, the route determining sections 2130, 2230, virtual link bandwidth allocating sections 2150, 2350, virtual link band width information supplying sections 2160, 2360, the displaying sections 2170, 2370, the route change detecting section 2280, the the link deletion detecting section 2281, the link addition adding section 2282, and the currently-used bandwidth information receiving section 2390 are elements for performing each process. Actually, the virtual private network managing devices 2100, 2200, 2300 are formed by computers in which a software is installed for executing these processes respectively. It is possible to contain this software in a recording medium such as a magnetic disk (floppy disk, hard disk, etc.), an optical disk (CD-ROM, DVD etc.), semiconductor memory, etc. as a program which can be executed in the computer so as to be distributed.

Industrial Applicability

According to the present invention, it is possible to realize a path design for the customer easily by providing the network information in the VPN provider and the network information of the customer network while realizing a high scalability.

Also, it is possible to convert the address; therefore, it is possible to design an independent address for each customer. This is that, because it is possible to change the device ID and the link IF ID which exist uniquely for each VPN virtually, it is possible to solve a duplication of the address by issuing different address to the device ID of the network and the device in the device in the network for each VPN even if there occurs a duplication of the address which overlap the address of the deice in the customer network and the link IF ID.

Also, according to the virtual private network managing device and the virtual private network supplying system according to the present invention, the predetermined virtual route which relates to the VPN is registered and the virtual link bandwidth is allocated to the corresponding route which corresponds to the registered virtual route. Therefore, it is possible to supply the information which indicates an accurate link bandwidth to the customer device with regardless to the data transferring route in the VPN of the virtual network supplying network.

Also, according to the present invention, it is possible to omit supplying an unnecessary information for the customer; thus, it is possible to propose only an information clearly which is necessary for the condition which is described in the resource contract. Furthermore, the provider which provides the path service can realize an effect for evading an undesirable side-effect in that an unnecessary detail information may be supplied.

The invention claimed is:

1. An apparatus for controlling virtual private network (VPN) communication in a network comprising:
 a first edge device in said network, the first edge device being directly connected to at least one customer edge device;
 said first edge device having a common database (common DB), the common DB being used for setting a path between said first edge device and another edge device in said network when a path setting request is issued by a customer to establish a first VPN communication between the first edge device and the another edge device and being used for supplying network information that is different than network information supplied for a different customer and being used for exchanging information between devices in the network, the common DB storing a plurality of pieces of link information to which a plurality of VPNIDs are added, each piece of link information being information about a link;
 said first edge device having a link information setting section or setting the plurality of pieces of link information in the common DB;
 said first edge device having a link information exchanging section for exchanging link information between the first edge device and the another edge device;
 said first edge device having a route calculating section which determines a transferring route for control information which is used for exchanging the link information;
 said first edge device having one or more VPNDBs, each VPNDB is a database corresponding to a different VPN and storing link information for the corresponding VPN, a given VPNDB being used to exchange network information between edge devices which belong to the corresponding VPN and customer edge devices which belong to the corresponding VPN;

said first edge device having a VPNDB generating section for generating the VPNDBs;

said first edge device having a VPNID setting device for categorizing the plurality of pieces of link information stored in the common DB in accordance with the VPN related to each piece of link information and for adding VPNID as information for identifying each VPN to each piece of link information; and said first edge device having a filtering section for extracting the link information to which the same VPNID is added from the plurality of pieces of link information stored in the common DB to which the VPNIDs are added and for storing the extracted link information in a corresponding VPNDB, wherein a given customer edge device is notified of network information only for the VPN to which the given customer edge device belongs, and if the value of a bandwidth included in the link information is changed, the link information exchanging section exchanges the link information between the the first edge device and the another edge device.

2. The apparatus according to claim 1, said first edge device further comprising a section for setting a tunnel for generating tunnels for exchanging the link information between edge devices in the network.

3. The apparatus according to claim 1, said first edge device further comprising a VPNDB in a part of the common DB; and a section for adding identification information for identifying recorded contents in each DB.

4. The apparatus according to claim 1, said first edge device further comprising a section for exchanging the link information between edge devices in the network by using the transferring route for the control information determined according to the route calculating section.

5. The apparatus according to claim 1, said first edge device further comprising:
   a section for notifying whether or not a VPNDB in the first edge device itself is a VPNDB relating to any one of VPNs; and
   a section for transferring the recorded contents in the VPNDB in the first edge device itself according to a request from the another edge device to the another edge device.

6. The apparatus according to claim 1, said first edge device further comprising:
   a section for performing a filtering operation by the filtering section and setting a tunnel by the section for setting a tunnel for the another edge device when the first edge device itself performs the filtering operation; and
   a section for setting a tunnel by the section for setting a tunnel for the another edge device when the another edge device performs the filtering operation by the filtering section.

7. The apparatus according to claim 6, said first edge device further comprising a section which determines that the first edge device itself performs the filtering operation when a hash value which is obtained by adding an ID of the first edge device itself for identifying the first edge device itself and the VPNID is greater than a hash value which is obtained by adding an ID for the another edge device which is information for identifying the another edge device and the VPNID.

8. The apparatus according to claim 1, said first edge device further comprising:
   a customer route flag setting section for setting a customer route flag when the link information which is received from a customer edge device is issued to the first edge device itself;
   a customer link information extracting section for extracting the link information in which the customer route flag is set; and
   a section for transferring the link information which is extracted by the customer link information extracting section together with the customer route flag and transferring the link information which is extracted by the customer link information extracting section by deleting the customer route flag.

9. The apparatus according to claim 1, said first edge device further comprising a signaling section for securing a resource for setting a path by receiving a path setting request from a customer edge device and transfers a path setting request to a next device in a network according to a path setting request.

10. A network having with the apparatus according to claim 6 or 7, the network being an only network having the filtering section in a network.

11. A non-transitory computer-readable storage medium encoded with a program which realizes functions which correspond to a VPN communication controlling device as an edge device in a network, comprising:
   a function corresponding to a common database so as to be used for setting a path, to store a plurality of pieces of link information to which a plurality of VPNIDs are added, each piece of link information being information about a link, to be used for exchanging information between edge devices in the network, and to be disposed in the VPN for setting a path between devices in the network when a path setting request is issued by a customer so as to supply different network information for each customer, each of the edge devices being directly connected to at least one customer edge device;
   a link information setting function for setting the plurality of pieces of link information in the common DB;
   a link information exchanging function for exchanging the link information between the device itself and another device in the network;
   a route calculating function for determining a transferring route for control information which is used for exchanging the link information;
   a VPNDB generating function for generating one or more VPNDBs, each VPNDB is a database corresponding to a different VPN and storing link information for the corresponding VPN, a given VPNDB being used to exchange network information between edge devices which belong to the corresponding VPN and customer edge devices which belong to the corresponding VPN;
   a VPNID setting function for categorizing the plurality of pieces of link information stored in the common DB in accordance with the VPN related to each piece of link information and for adding VPNID as information for identifying each VPN to each piece of link information;
   a filtering function for extracting the link information to which the same VPNID is added from the plurality of pieces of link information stored in the common DB to which the VPNIDs are added and for storing the extracted link information in a corresponding VPNDB; and
   a function for notifying each customer edge device of network information related to only the VPN to which each customer edge device belongs,
   wherein if the value of a bandwidth included in the link information is changed, the link information exchanging function exchanges the link information between the device itself and the another device.

12. The non-transitory computer-readable storage medium according to claim 11 for realizing a function for setting a tunnel for exchanging the link information between edge devices in the network.

13. The non-transitory computer-readable storage medium according to claim 11 for realizing a function corresponding to the VPNDB in a part of the function corresponding to the common DB and adding identification information for identifying the recorded contents in each DB.

14. The non-transitory computer-readable storage medium according to claim 11 for realizing a function for exchanging the link information between edge devices in the network by using the transferring route for the control information which is determined according to the route calculating function.

15. The non-transitory computer-readable storage medium according to claim 11 for realizing functions for:
 notifying whether or not a VPNDB in the device itself is a VPNDB which relates to any one of VPNs; and
 transferring the recorded contents in the VPNDB in the device itself according to a request from the another device to the another device.

16. The non-transitory computer-readable storage medium according to claim 11 for realizing functions for:
 performing a filtering operation by the filtering function and setting a tunnel by the function for setting a tunnel for the another device when the device itself performs the filtering operation; and
 setting a tunnel by the function for setting a tunnel for the another device when the another device performs the filtering operation by the filtering function.

17. The non-transitory computer-readable storage medium according to claim 16 for realizing a function for determining that the device itself performs the filtering operation when a hash value which is obtained by adding an ID of the device itself for identifying the device itself and the VPNID is greater than a hash value which is obtained by adding an ID for the another device which is information for identifying the another device and the VPNID.

18. The non-transitory computer-readable storage medium according to claim 11 further realizing functions for:
 setting a customer route flag when the link information which is received from a customer edge device is issued to the device itself; and
 a customer link information extracting function which extracts the link information in which the customer route flag is set; and transferring the link information which is extracted by the customer link information extracting function together with the customer route flag and transfers the link information which is extracted by the customer link information extracting function by deleting the customer route flag.

19. The non-transitory computer-readable storage medium according to claim 11, further comprising a signaling function for securing a resource for setting a path by receiving a path setting request from a customer edge device and transferring a path setting request to a next device in a network according to a path setting request.

* * * * *